United States Patent
Harviainen et al.

(10) Patent No.: US 11,202,051 B2
(45) Date of Patent: Dec. 14, 2021

(54) SYSTEM AND METHOD FOR DISTRIBUTING AND RENDERING CONTENT AS SPHERICAL VIDEO AND 3D ASSET COMBINATION

(71) Applicant: PCMS Holdings, Inc., Wilmington, DE (US)

(72) Inventors: Tatu V. J. Harviainen, Helsinki (FI); Marko Palviainen, Espoo (FI)

(73) Assignee: PCMS Holdings, Inc., Wilmington, DE (US)

( * ) Notice: Subject to any disclaimer, the term of this patent is extended or adjusted under 35 U.S.C. 154(b) by 87 days.

(21) Appl. No.: 16/611,803

(22) PCT Filed: May 11, 2018

(86) PCT No.: PCT/US2018/032374
§ 371 (c)(1),
(2) Date: Nov. 7, 2019

(87) PCT Pub. No.: WO2018/213131
PCT Pub. Date: Nov. 22, 2018

(65) Prior Publication Data
US 2021/0084278 A1    Mar. 18, 2021

Related U.S. Application Data

(60) Provisional application No. 62/508,120, filed on May 18, 2017.

(51) Int. Cl.
*H04N 13/122* (2018.01)
*H04N 13/279* (2018.01)
(Continued)

(52) U.S. Cl.
CPC ....... *H04N 13/122* (2018.05); *G02B 27/0101* (2013.01); *G06T 19/006* (2013.01);
(Continued)

(58) Field of Classification Search
CPC .. H04N 13/122; H04N 13/279; H04N 13/332; H04N 13/383; H04N 13/117; G02B 27/0101; G02B 2027/0129; G06T 19/006
See application file for complete search history.

(56) References Cited

U.S. PATENT DOCUMENTS

| | | | |
|---|---|---|---|
| 9,549,174 B1 | 1/2017 | Chavez | |
| 2009/0005961 A1* | 1/2009 | Grabowski | G02B 27/01 701/532 |

(Continued)

FOREIGN PATENT DOCUMENTS

| | | |
|---|---|---|
| EP | 2492870 A2 | 8/2012 |
| EP | 2492870 B1 | 8/2012 |
| WO | 2013167901 A1 | 11/2013 |

OTHER PUBLICATIONS

Invitation to Pay Additional Fees, and, where applicable, protest for PCT/US2018/032374 dated Sep. 7, 2018, 9 pages.

(Continued)

*Primary Examiner* — Jitesh Patel
(74) *Attorney, Agent, or Firm* — Invention Mine LLC

(57) ABSTRACT

Motion parallax effects can be emulated for 3D video content. At a head mounted display (HMD), motion parallax may be emulated through: receiving a 3D video at the HMD; obtaining a model of an object in the 3D video; obtaining a processed 3D video in which the 3D video is processed to remove the object from the 3D video; tracking a change in position of the HMD by a sensor of the HMD; rendering the processed 3D video at the HMD; and rendering the model of the object at a position in the processed 3D video based on the tracked change in position of the HMD. Multilayer spherical video, indicating the depths of objects therein, which may be used for motion parallax emulation may also be generated.

20 Claims, 18 Drawing Sheets

(51) Int. Cl.
*H04N 13/332* (2018.01)
*H04N 13/383* (2018.01)
*H04N 13/117* (2018.01)
*G02B 27/01* (2006.01)
*G06T 19/00* (2011.01)

(52) U.S. Cl.
CPC ......... *H04N 13/117* (2018.05); *H04N 13/279* (2018.05); *H04N 13/332* (2018.05); *H04N 13/383* (2018.05); *G02B 2027/0129* (2013.01)

(56) References Cited

U.S. PATENT DOCUMENTS

| | | | | |
|---|---|---|---|---|
| 2010/0225743 | A1* | 9/2010 | Florencio | H04N 13/117 348/46 |
| 2012/0002014 | A1 | 1/2012 | Walsh | |
| 2012/0139906 | A1 | 6/2012 | Zhang | |
| 2012/0200676 | A1* | 8/2012 | Huitema | H04N 13/128 348/51 |
| 2014/0104381 | A1* | 4/2014 | Maleki | H04N 13/264 348/43 |
| 2014/0321702 | A1* | 10/2014 | Schmalstieg | G06K 9/00624 382/103 |
| 2015/0084951 | A1 | 3/2015 | Boivin | |
| 2015/0288944 | A1 | 10/2015 | Nistico | |
| 2015/0293362 | A1 | 10/2015 | Takahashi | |
| 2015/0332511 | A1 | 11/2015 | Jovanovic | |
| 2015/0379770 | A1 | 12/2015 | Haley, Jr. | |
| 2016/0019724 | A1 | 1/2016 | Verdier | |
| 2016/0026253 | A1 | 1/2016 | Bradski | |
| 2016/0070109 | A1* | 3/2016 | Mullins | G02B 27/0176 359/630 |
| 2016/0163048 | A1 | 6/2016 | Yee | |
| 2016/0191893 | A1 | 6/2016 | Gewickey | |
| 2016/0255322 | A1 | 9/2016 | Kerofsky | |

OTHER PUBLICATIONS

International Search Report and Written Opinion of the International Searching Authority for PCT/US2018/032374 dated Oct. 29, 2018, 15 pages.
Written Opinion of the International Preliminary Examining Authority for PCT/US2018/032374 dated Apr. 12, 2019, 7 pages.
International Preliminary Report on Patentability for PCT/US2018/032374 completed on Jul. 3, 2019, 20 pages.
Kronander, Joel, et al. "Photorealistic Rendering of Mixed Reality Scenes". Computer Graphics Forum, (2015), pp. 643-665.
Koyama, Takayoshi, et. al., "Live Mixed-Reality 3D Video in Soccer Stadium". Proceedings of the 2nd IEEE/ACM International Symposium on Mixed and Augmented Reality, (2003), pp. 178-186.
Kawai, Norihiko, et. al., "Diminished Reality Considering Background Structures". IEEE International Symposium on Mixed and Augmented Reality (ISMAR), (2013), pp. 259-260.
Guan, Hao, et. al., "Structure-From-Motion in Spherical Video Using The von Mises-Fisher Distribution". IEEE Transactions on Image Processing, Jun. 2016, pp. 1-13.
Sand, Peter, et. al., "Video Matching". ACM Transactions on Graphics (TOG), vol. 22, No. 3, (2004), 592-599.
Prati, Andrea, et al. "Detecting Moving Shadows: Algorithms and Evaluation". IEEE Transactions on Pattern Analysis and Machine Intelligence, vol. 25, No. 7, Jul. 2003, pp. 918-923.
Scaramuzza, Davide, et. al., "A Flexible Technique for Accurate Omnidirectional Camera Calibration and Structure from Motion". Proceedings of the Fourth IEEE International Conference on Computer Vision Systems (ICVS), (2006), 8 pages.
Wikipedia, "Shadow Volume". Wikipedia article, available at: https://en.wikipedia.org/w/index.php?title=Shadow_volume&oldid=813601587, modified on Dec. 4, 2017, 6 pages.
Li, Ming, et. al., "Pseudo-Immersive Real-Time Display Of 3d Scenes on Mobile Devices". International Conference on 3D Imaging, Modeling, Processing, Visualization and Transmission, IEEE, (2011), pp. 41-48.
Lamberti, Fabrizio, et. al., "A Streaming-Based Solution for Remote Visualization Of 3D Graphics on Mobile Devices". IEEE Transactions on Visualization and Computer Graphics, Mar.-Apr. 2007, vol. 13, No. 2, pp. 247-260.
Feißt, Markus, et. al., "Virtual Reality Data Visualisation On and Via Mobile Phones". In Photonics in Multimedia, International Society for Optics and Photonics, vol. 6196, Apr. 2006, pp. 240-250.
Siltanen, Sanni, "Diminished Reality for Augmented Reality Interior Design". The Visual Computer, vol. 33, No. 2., Feb. 2017, pp. 193-208.
Khan, Salman H., et al. "Automatic Shadow Detection and Removal from A Single Image". IEEE Transactions on Pattern Analysis and Machine Intelligence, vol. 38, No. 3, Mar. 2016, pp. 431-446.
Mukherjee, Deb, et. al. "How we're making even more 3D video available on YouTube". YouTube Blog article, available at: https://youtube.googleblog.com/2012/04/how-were-making-even-more-3d-video.html, Apr. 5, 2021, pp. 1-4.
Matlab on-line documentation, 'What Is Camera Calibration?', web page, referenced Feb. 21, 2017.
Igarashi, Takeo, et. al., "Teddy: A Sketching Interface For 3D Freeform Design". ACM SIGGRAPH Courses, (2007), pp. 409-416.

* cited by examiner

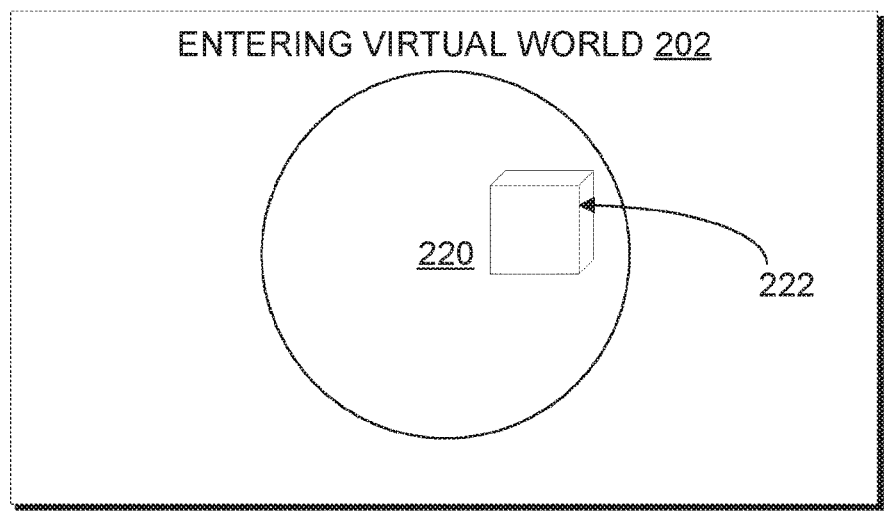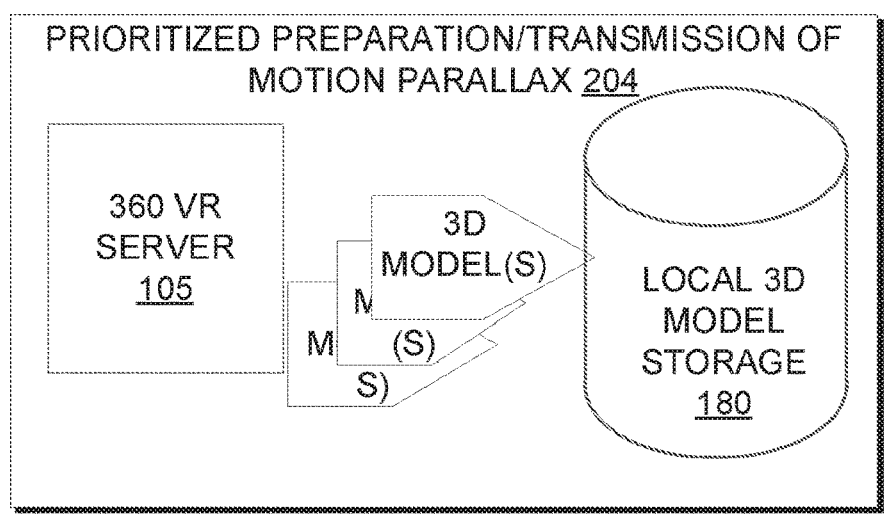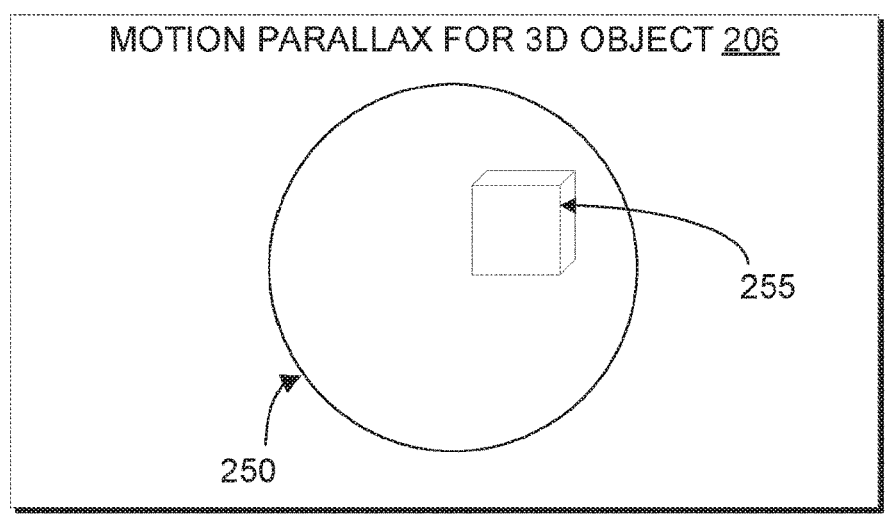
FIG. 2

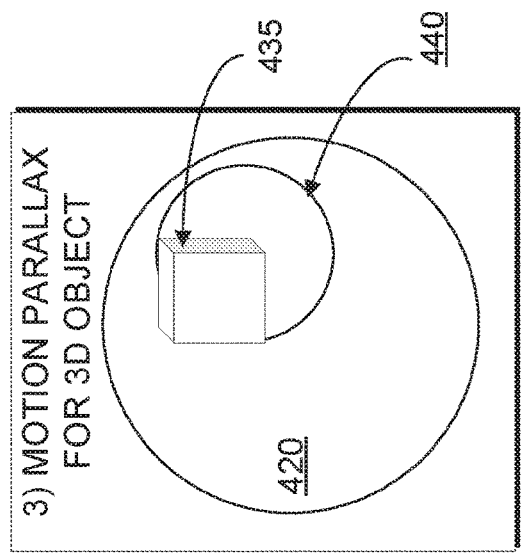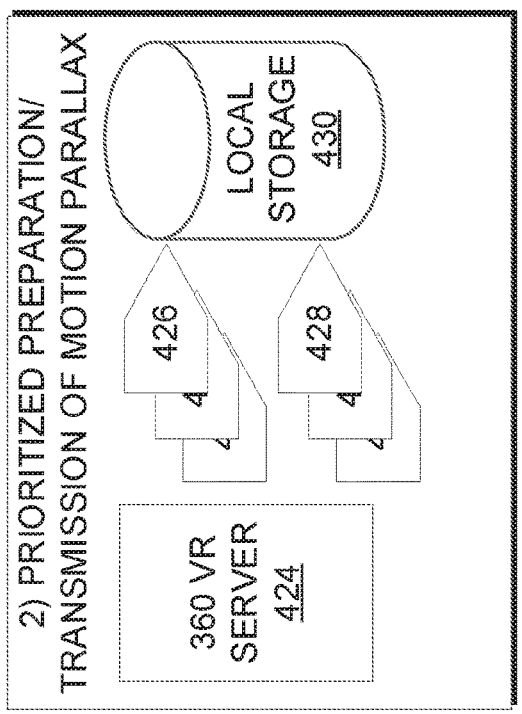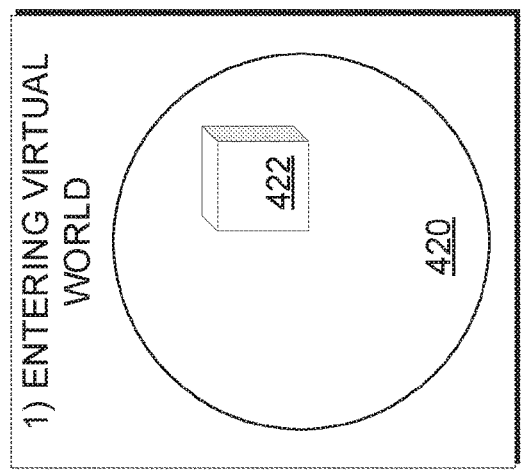
FIG. 4A
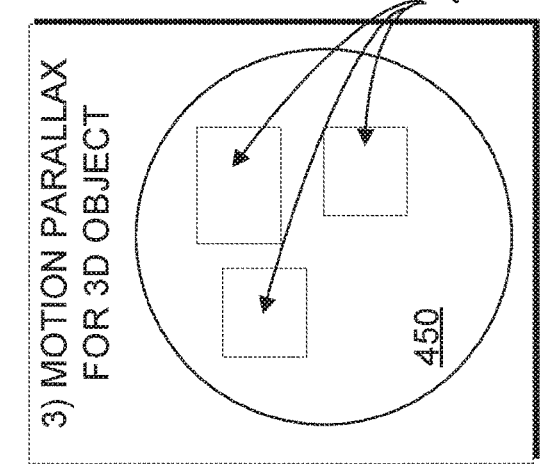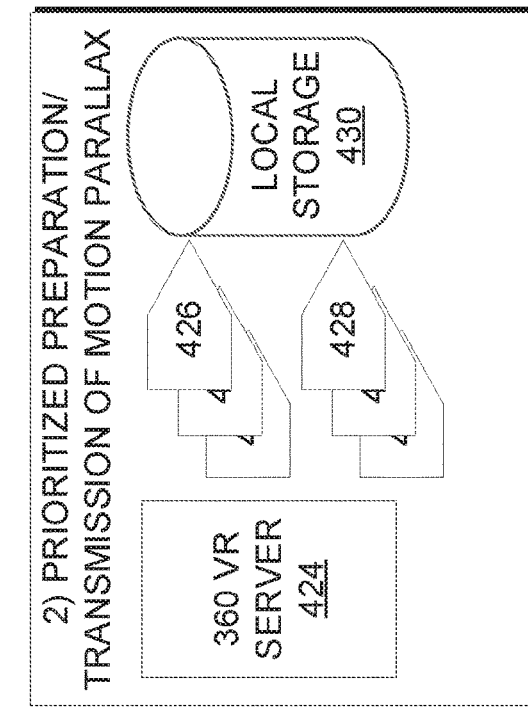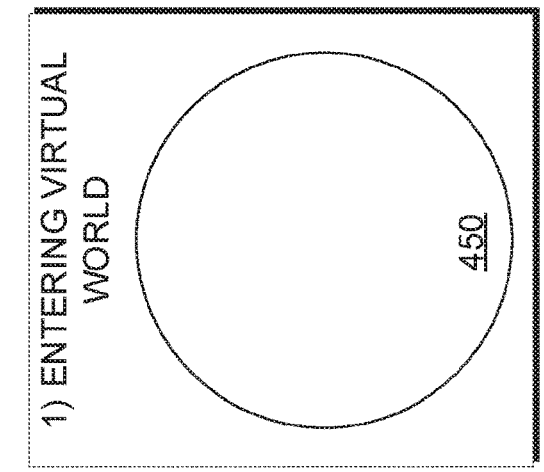
FIG. 4B

SYSTEM AND METHOD FOR DISTRIBUTING AND RENDERING CONTENT AS SPHERICAL VIDEO AND 3D ASSET COMBINATION

CROSS-REFERENCE TO RELATED APPLICATIONS

The present application is a national stage application under 35 U.S.C. § 371 of International Application No. PCT/US2018/032374, entitled "SYSTEM AND METHOD FOR DISTRIBUTING AND RENDERING CONTENT AS SPHERICAL VIDEO AND 3D ASSET COMBINATION," filed on May 11, 2018, which claims benefit under 35 U.S.C. § 119(e) from U.S. Provisional Patent Application Ser. No. 62/508,120, filed May 18, 2017, entitled "SYSTEM AND METHOD FOR DISTRIBUTING AND RENDERING CONTENT AS SPHERICAL VIDEO AND 3D ASSET COMBINATION", which is incorporated herein by reference in its entirety.

BACKGROUND

Virtual Reality (VR) settings are often facilitated with a head-mounted display (HMD) device that is able to be connected to different kinds of networks. Motion parallax is the apparent motion of an object relative to the background when the viewer moves to a new viewpoint. Some existing 360-degree video solutions, such as three Degree-of-Freedom (DOF) VR, provide imagery from only a single camera position. The viewpoint may change, but it will not exhibit motion parallax. Therefore, if the viewer of a 360-degree video translates their viewing position, such as by moving their head sideways, the 360-degree video remains unchanged. While full six DOF VR enables motion parallax for increased realism, significant computation, rendering, and bandwidth requirements may result, in addition to the HMD potentially being a tethered HMD. Systems and methods set forth herein seek to address these issues, and others.

SUMMARY

In accordance with some embodiments set forth herein, there are systems and methods for displaying VR objects with motion parallax effects in three DOF systems.

In some embodiments, an example method of emulating motion parallax at a head mounted display (HMD) includes: receiving a 3D video at a HMD; obtaining a model of an object in the 3D video; obtaining a processed 3D video in which the 3D video is processed to remove the object from the 3D video; tracking a change in position of the HMD by a sensor of the HMD; rendering the processed 3D video at the HMD; and rendering the model of the object at a position in the processed 3D video based on the tracked change in position of the HMD.

In some embodiments, an example method for emulating motion parallax at a head mounted display (HMD) includes: displaying at a HMD a received 3D video; selecting an object in the 3D video for motion parallax emulation; obtaining a 3D model of the object in the 3D video; removing the object from the 3D video to prepare a processed 3D video without the object; tracking a change in position of the HMD by a sensor of the HMD; rendering the processed 3D video at the HMD; and rendering the 3D model of the object at a position in the processed 3D video based on the tracked change in position of the HMD.

In accordance with some embodiments set forth herein, there are systems and methods for generating multilayer spherical video.

In some embodiments, an example method of generating a multilayer spherical video includes: obtaining a 3D reconstruction of a static environment; obtaining a spherical video of a scene of the environment with a dynamic element present; for each frame of the obtained spherical video: estimating depth values for the dynamic element based on comparison of the 3D reconstruction of the static environment and the spherical video using lighting simulation through differential rendering; assigning depth values for the remainder of the frame based on the 3D reconstruction of the static environment; and dividing the frame into a plurality of depth layers based on the estimated and assigned depth values; and generating a multilayer spherical video from the depth layers of the frames.

BRIEF DESCRIPTION OF THE DRAWINGS

FIG. 2 depicts an example process of implementing motion parallax, in accordance with some embodiments.

FIG. 4A depicts an example approach for providing a motion parallax effect in a HMD, in accordance with some embodiments.

FIG. 4B depicts an example approach for providing a motion parallax effect in a HMD, in accordance with some embodiments.

Figure 1:
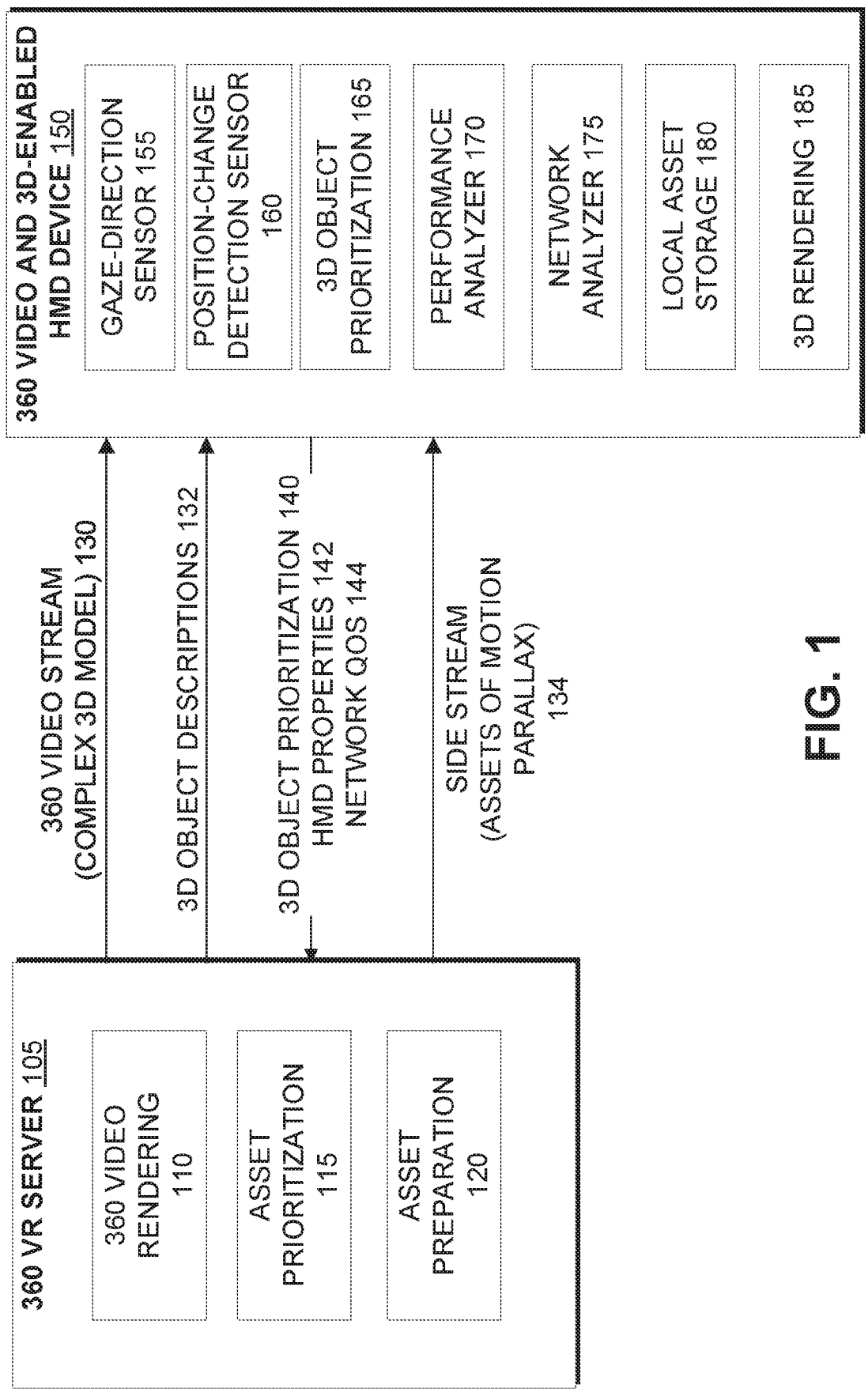
FIG. 1 depicts a schematic plan view of a VR system, in accordance with some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment . . . " For brevity and clarity of presentation, this implied leading clause is not repeated ad nauseum in the detailed description of the drawings.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Distributing and Rendering Content.

Virtual Reality (VR) settings are often facilitated with a head-mounted display (HMD) device that is able to be connected to different kinds of networks. Motion parallax is the apparent motion of an object relative to the background when the viewer moves to a new viewpoint. Some 360-degree video solutions (e.g., three Degree-of-Freedom (DOF) VR) provide imagery from only a single camera position. The viewpoint may change, but it will not exhibit motion parallax. Therefore, if the viewer of a 360-degree video translates position, the 360-degree video is unchanged. Full six DOF VR enables motion parallax for increased realism, but often significant computation, rendering, and bandwidth may be required, in addition to the HMD being a tethered HMD. Thus, there are needs for systems and methods of distributing and rendering content as spherical video and 3D asset combination.

Systems and methods described herein, in accordance with some embodiments, relate to user interfaces that display relevant VR scenes to a user. Various HMD devices are generally available to present VR scenes to users. However, processing full motion parallax for display in a VR device for all objects may degrade the VR experience for the user. In some embodiments, systems and methods set forth herein provide motion parallax simulation for VR objects.

In some embodiments, a HMD device is connected to different kinds of networks, wired or wireless, to provide an VR environment for a user. The HMD device may have varying rendering powers, memory capacity, and may have access to different speed networks. The rendering power for different 3D models may vary in a HMD. For example, some HMDs may not be able to render 3D graphics or only render basic 3D graphics. The HMD's memory capacity may vary. Memory consumption may depend on the complexity and number of 3D models stored in the device's internal memory. The HMD may also have access to different speed networks that provide varying bandwidth and Quality of Service (QoS), for example different reliability and latency parameters.

In some embodiments, the rendering tasks are divided between the HMD and a networked computing device, such as a server. For example, a HMD may have limited or otherwise restricted rendering capabilities and may receive, via the network connection, server-side rendered data. The HMD may then display the received data.

Increasing processing power and memory capacity of computers have made it possible to provide virtual worlds that contain more and more details and visual elements. The VR experiences provide realistic digital experiences for their users. However, the complexity of 3D models used as a base of certain advanced VR solutions may require capabilities that may be difficult to achieve in, for example, wireless/battery-based, small-scale and lightweight devices such as in mobile devices used as HMD devices.

In some embodiments, the 3D models are rendered on the server-side and then the rendered frames are delivered over a wireless network for the HMD device that then displays the rendered frames for the user. However, in certain cases with many simultaneous users, the user count may be difficult to handle, as the real-time rendering (e.g., 20 fps) may require processing power to generate different renderings per client and a large amount of bandwidth to transmit the data. For example, in a case in which there are 1000 users, it can be difficult to provide a server that is capable of rendering frames for the users and wireless network connections that can deliver these frames to the client devices. One possibility to limit the processing load on the server-side is to render the 3D scene as a combination of a spherical video and a 3D model. As a result, the same 3D, or 360-degree, content can be delivered to all users that are in the same position in the virtual world regardless of viewing direction. Each HMD display can then display the content based on the viewing angle of the particular user.

Motion parallax effects are improved with shorter network response times. Latencies, such as network latencies related to server-side rendering, may make the motion parallax effect uncomfortable for the user. As a result, it may not be feasible to produce the motion parallax effect via some current network and remote rendering solutions.

In some embodiments, local rendering refers to a local (e.g., desktop, HMD, mobile device) computer performing the rendering of 3D models. In some embodiments, use of a VR application is possible in one location. In addition, in the case of complex 3D models, the user may have to make substantial monetary investment in a computer or computers performing the rendering tasks with a desired framerate. Processing used by rendering calculations may also drain the battery of a mobile device.

In some embodiments, server-side rendering refers to the server-side performing the rendering tasks and streaming the produced frames over a network connection to a client device. The client then displays the frames for the users. However, in some such embodiments, network latencies may prohibit effective visualization of augmented reality graphics, particularly convenient motion parallax effects for the 3D content, in some network conditions.

In some embodiments, shared rendering refers to the rendering tasks being shared between the server-side and client-side. The pre-processing performed on the server-side may make it easier for the client-side (e.g., a mobile device) to perform the rest of the rendering tasks. The processing of 360-degree videos may be a shared processing with the rendering effort between the client and server-side.

In some embodiments of providing motion parallax effect for 3D objects and for users using HMD or other 360-degree video rendering devices with heterogeneous capabilities, the method comprises rendering 360-degree video of a 3D model, detecting objects of interest, and passing 3D models of objects of interest to the HMD device to perform a portion of the rendering for providing a motion parallax effect for the selected objects of the 3D content.

Motion parallax may not be necessary or desirable for all content in a given 360-degree video, and in various embodiments motion parallax may be selectively applied within the 360-degree content. In some embodiments, a determination is made for which objects in a VR scene motion parallax will be provided. The objects may be objects of interest, objects that are at a suitable visual distance, objects of suitable visual complexity, and/or the like. An object of interest may be a 3D object that a user is currently expressing interest in, such as via gaze detection, or the like.

The motion parallax effect may not necessarily be observable for the user if there is a large distance between the user and the object(s). Thus, distance may be used in determining whether to provide motion parallax for a selected object. Additionally, the activation of the motion parallax effect for an object may be based on the complexity of the 3D object(s). Objects with higher complexity may require too much processing power. 3D rendering of such objects can be omitted if the motion parallax effect does not provide enough added benefit to the VR user. The added benefit to the VR user may be determined by an estimation of visual offset based on the distances between the object(s) and the VR user. Another method of determining an added benefit to the VR user may include determining if the VR user's interest exceeds an interest threshold. If the user is not interested in a VR object, then it may not be worth the processing power to produce the motion parallax for that object.

The determination of whether to provide for the motion parallax effect for an object may further be dependent on the rendering power of the HMD device. There may be HMD devices capable of rendering complex 3D models and providing full motion parallax effect for 3D objects. However, for some devices with full rendering capabilities there can be limitations or other restrictions in the available bandwidth of a wireless network that may prevent fast transmission of complex 3D models and textures to the HMD device. Some exemplary embodiments provide an approach that enables fast entering to a virtual world. For example, an exemplary system may first render the 3D model as video frames, and then in the background transmit and/or prepare the 3D assets for the HMD device, which may then move to a local rendering mode.

For devices with partial rendering capabilities, it can be difficult to achieve the desired frame rate. In some such embodiments, the rendering may be dynamically shared between the server-side and the client-side. For example, in a virtual world there can be segments that do not contain as many objects (and polygons), and so it is possible to render all the content on the client-side. In some cases, dynamic adaptation is performed so that a part of the 3D content is rendered on the server-side and only a limited part of the 3D content is rendered in the HMD device.

For devices without 3D rendering capabilities, in some embodiments, the devices may be extended with software modules that insert 3D rendering and motion parallax capabilities to the HMD device. The rendering is first performed on the server-side and presented in the HMD device. In some such embodiments, the system may install assets which may be needed to the HMD device and set the HMD device to a full/partial rendering mode.

In some embodiments, the HMD devices are used in a mobile environment that can provide varying network bandwidth for its users. In the case of complex 3D models a network can enable fast or slow network connections.

Fast network connections may enable fluent transmission of the 3D content. In some such embodiments, the network bandwidth enables transmission of the 3D content from the server to the client. In this case, there may be no need for prioritization for 3D content that is transmitted over the network. Slow network connections enable transmission of, for example, the most interesting parts of the 3D content. The network bandwidth may limit the transmission of 3D content (e.g., models and textures); thus, there may be prioritization performed for the content that is transmitted over the network.

FIG. 1 depicts a schematic plan view of a Virtual Reality (VR) system, in accordance with some embodiments. In particular, FIG. 1 depicts the system that includes a 360 VR server 105 on the left, and a 360 Video and 3D-enabled HMD device 150 on the right. The 360 VR Server 105 comprises a 360-video rendering module 110, an asset prioritization module 115, and an asset preparation module 120. The 360 Video and 3D-enabled HMD Device 150 comprises a Gaze-Direction sensor 155, a Position-Change Detection sensor 160, a 3D Object Prioritization module 165, a Performance Analyzer 170, a Network Analyzer 175, a Local Asset Storage 180, and a 3D Rendering module 185. The 360 VR Server 105 provides a 360 Video Stream 130, 3D object descriptions 132, and a side stream of motion parallax assets 134 to the HMD device 150. The HMD device 150 provides 3D object prioritization data 140, HMD properties 142, and network QoS data 144 to the server. The components of the server 105 and HMD device 150 are configured to perform the operations described herein.

The 360 VR Server produces a 360 video of a virtual world that may be referred to as a complex 3D model. The 360 VR Server also generates descriptions for 3D objects that are shown in the 360 video for the hybrid HMD device and provides these descriptions to the HMD device. The server prioritizes and delivers the models of the desired 3D objects (e.g., objects of interest) of the virtual world for the hybrid HMD device. In some embodiments, when motion parallax is to be performed, the depictions of the objects to which the motion parallax effect(s) are to be applied may be removed from the 360 video.

The HMD device is configured to display 360 videos for to the user. It is further configured to detect a user's gaze-direction, position changes (e.g., head tracking), use the 3D object descriptions and prioritize 3D objects for motion parallax effects. Information about the 3D object prioritization, HMD properties, and network properties for the server-side are passed to the VR server. Depending on the configuration of the HMD, rendering of the 3D object models (e.g., for limited-size 3D object models) is performed by the HMD. The rendered objects are displayed in a correct position within the 360 video. The HMD is able to switch between i) a pure 360 video mode and ii) a 360 video and 3D object-based motion parallax mode.

FIG. 2 depicts an example process of implementing motion parallax, in accordance with some embodiments. The example process may be used to enable representation of motion parallax effects in HMD devices with limited processing power and memory. The process may be performed using, for example, the example system architecture of FIG. 1, on the server-side/client-side as individual threads running in parallel, communicating via inter-process communications, shared memory, message passing, and/or the like.

At some point, a user may "enter" a virtual world (202), where circle 220 represents a 360 degree ("360") video for a complex 3D model, including at least one 3D object 222 at an initial location in the video. Entering the virtual world may include, for example, a server-side rendering of 360 video frames, streaming of 360 video to the HMD device, gaze-direction detection, output of 360 video at the HMD device, and/or the like.

With the virtual world entered, the motion parallax assets may be prepared (204). The 360 VR server (105) may provide 3D model information to a local 3D model storage (180) of the HMD device (150). In the preparation of motion parallax, for example, 3D object descriptions are delivered, and 3D objects are prioritized. According to the example, objects of interest are detected, and a prioritization of assets for motion parallax is determined. According to the example, the assets may be prepared and stored in local storage.

At 206 of the process, the motion parallax is output by the HMD device. This comprises detection of gaze-direction and position changes, a server-side rendering of 360 video frames with the object of interest representations removed, and an output of 360 video (250) without the initial 3D object representation (222), and the display assets of the interesting 3D object (255). The motion parallax effect is provided by the relocation of the 3D object 255 relative to its initial position in the 360 video (for initial 3D object 222).

In some embodiments, the process enables a motion parallax effect for selected elements of complex 3D models in HMD devices with, for example, limited capabilities. In some such embodiments, more immersive and enhanced representations may be provided for complex 3D models and for the users of heterogeneous HMD devices that are connected to different types of networks. In some embodiments, the same or similar processes may be used even when HMD or client-side do not have limited capabilities, for reasons such as QoS management, network usage concerns, and/or the like.

In some embodiments, representation of a motion parallax effect is enabled and the preparation of motion asset parameters is handled automatically. This will allow generation of richer experiences in a very wide array of HMD devices and wireless networks and use scenarios. For example, HMD devices can vary all the way from low-power HMD devices with limited rendering capabilities to HMD devices that have high processing power, memory capacity and access to a high speed network. The use scenarios can vary from simple entertainment to support in maintenance/service works in physical environments.

Figure 3A:
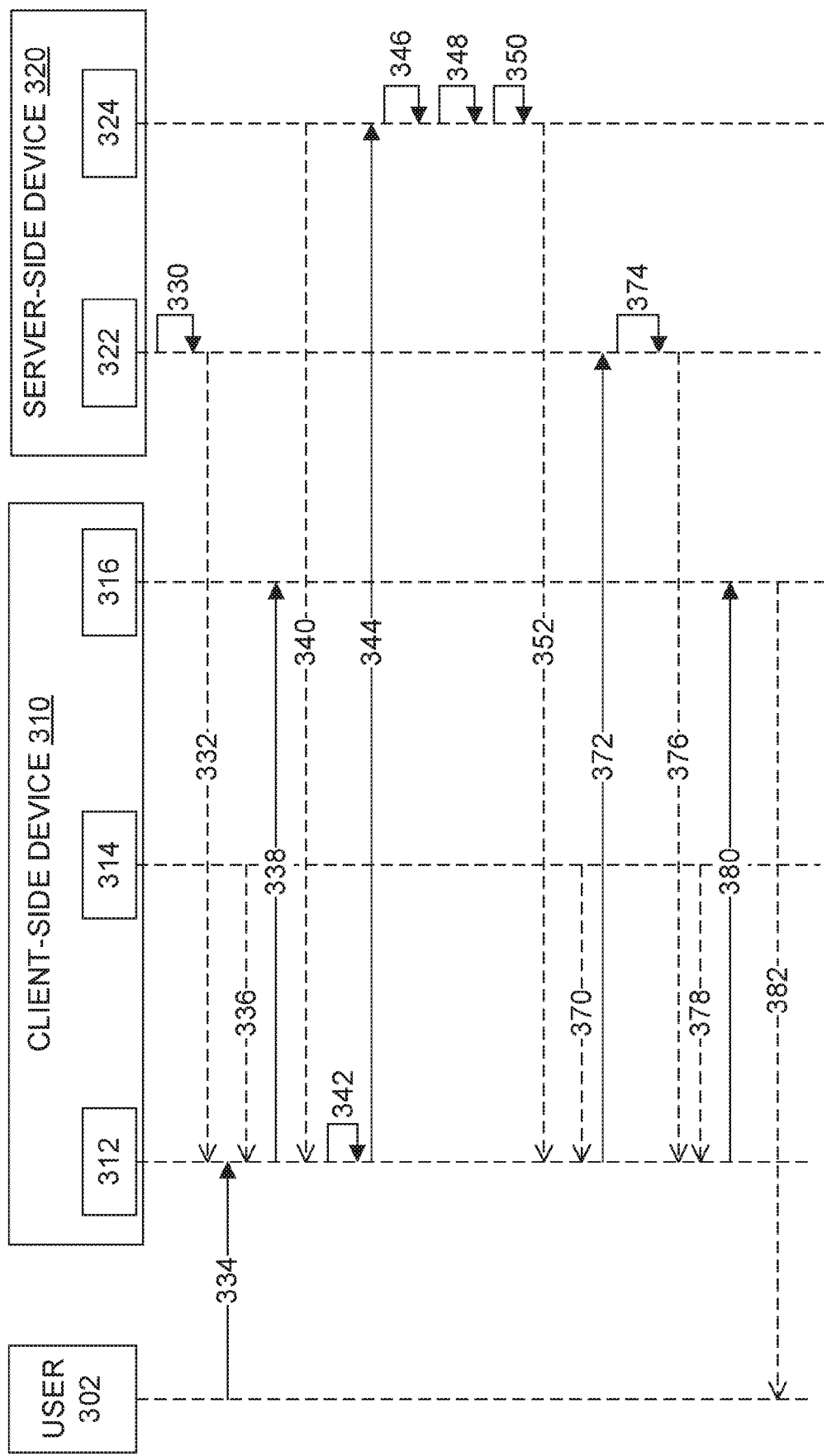
FIGS. 3A-3B depict sequence diagrams for enabling motion parallax for selected elements of complex 3D models in client-side devices, in accordance with some embodiments.
Figure 3B:
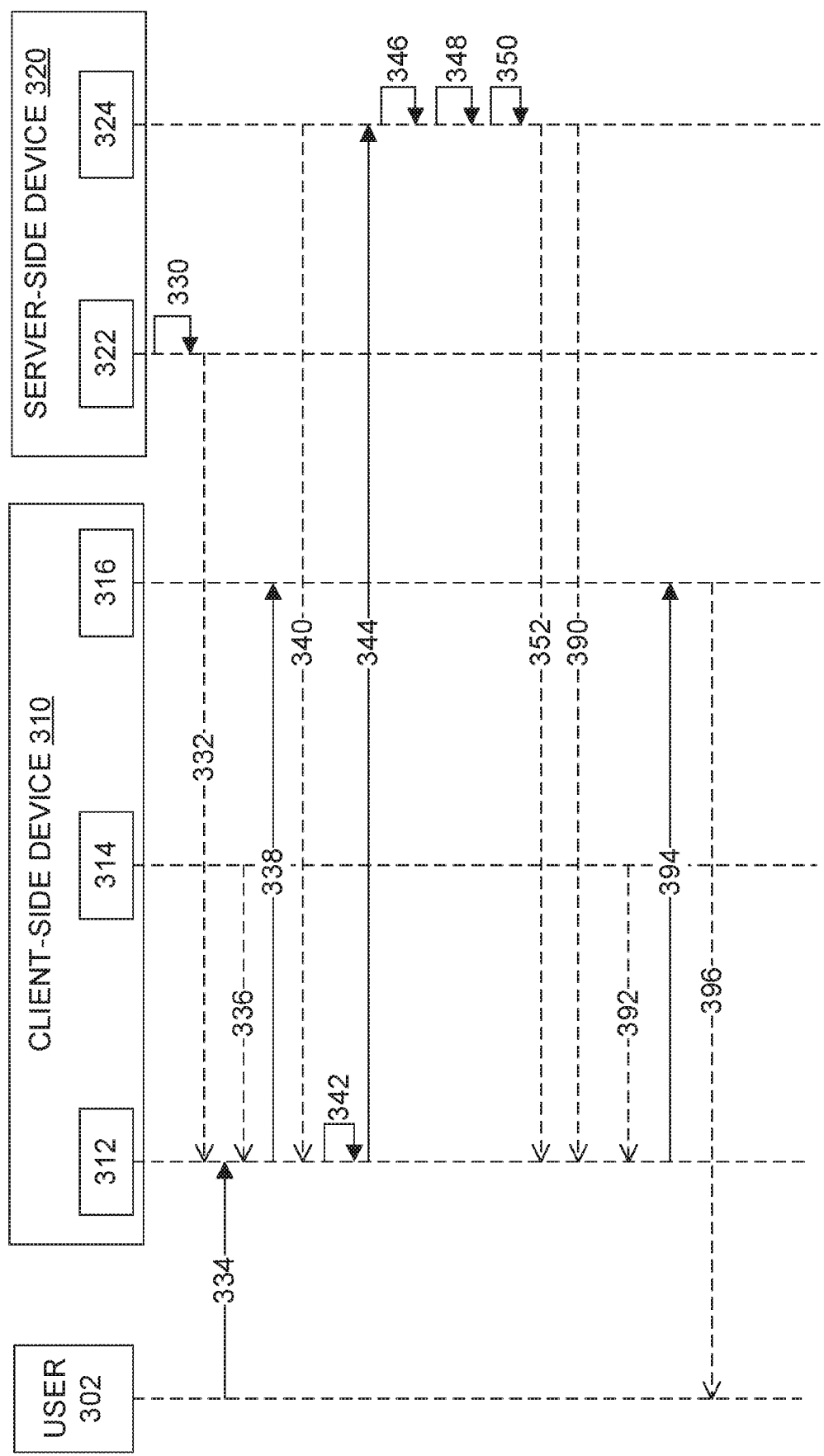

FIGS. 3A-3B depict sequence diagrams of enabling motion parallax for selected elements of complex 3D models in HMD devices, in accordance with some embodiments. In some embodiments of enabling motion parallax for selected elements of complex 3D models in HMD devices, as shown in the sequence diagrams of FIGS. 3A-3B, a user 302 may enter a virtual world, facilitated by a client-side device 310 (e.g., an HMD) and a server-side device 320. In some embodiments, the client-side device 310 may include a user experience (UX) manager 312, HMD sensors 314, and a 3D rendering/display module 316. The server-side device 320 may include a 360 video rendering module 322 and a motion parallax preparation module 324.

As shown in FIG. 3A, in some embodiments, the motion parallax effect may use a rendering of the 360 video without the 3D object of interest and a local rendering of the 3D object of interest. In such embodiments, the server is used for rendering of the 360 video without the interesting object(s) for motion parallax. As shown in FIG. 3B, in some other embodiments, patches may be used in the presentation of motion parallax.

As depicted by the sequence diagram of FIGS. 3A-3B, for some embodiments where a user's client device has limited capabilities (or, e.g., is operating in a lower functionality mode), prior to the user 302 entering the virtual world, the server 320 may render a 360 video of the complex 3D model (330) that defines the virtual world.

The server-side device 320 delivers the 360 video stream (332) for the HMD device 310 over a network connection, for example a wireless network connection. With the virtual world rendered, the user 302 can enter (334) the virtual world, with display by the HMD 310. The HMD sensors 314 detect the user's gaze-direction and provide this information (336) to the UX manager 312. In some embodiments, the server-side 310 uses the gaze-direction information and generates higher resolution 360 video for the region of interest, for example, for the region the user is looking at. The HMD device displays the 360 video (338) in the correct viewing angle for the user.

In preparation for motion parallax, the user 302 interacts with the 360 video and looks at an object in the video. In the background, the UX manager 312 initiates the process for a request for the server-side device 320 to prepare motion parallax assets for the objects of the 360 video. The motion parallax preparation module 324 may communicate 3D object descriptions (340) for 3D objects shown in the 360 video to the UX manager 312. For example, the 3D objects descriptions can specify positions for 3D objects, distance to 3D objects, and complexity of 3D objects.

The UX manager 312 may then prioritize 3D objects (342). The prioritization may be based on, for example, on a user's gaze-direction (e.g., the 3D object that the user is currently looking at or has recently looked at, a prediction of gaze direction, etc.), a distance to an object, and the complexity of the 3D object, and/or the like. The motion parallax effect may not be visible if there is a large distance from the user to the 3D object in the 360 video, such as for objects in a landscape. In such instances, the prioritization may be lowered for objects that are far away from the user, so that the motion parallax effect will not be provided for these objects. For example, objects at a distance beyond a threshold distance from the user may have their priority reduced or eliminated for provision/emulation of motion parallax for those objects. In some embodiments, the complexity or size of the 3D object may affect the prioritization of the object, with more complex object having reduced priority. For example, if the size of a 3D object exceeds a threshold size, the object may have its priority reduced or eliminated for provision/emulation of motion parallax.

A user may also enable motion parallax effects for special kinds of objects, such as for objects related to a current task of the user. In some embodiments, the displacement model is managed to allow small displacements. To avoid drift in the offset used for motion parallax rendering, the offset may slowly decay to zero.

Based on the prioritization, the UX manager 312 may communicate with the motion parallax preparation module 324 to prepare assets (344) for motion parallax, such as by communicating the 3D object prioritization, HMD properties, network properties, and/or the like. In some embodiments, objects of interest are, for example, objects detected by the server-side device based detecting a user's interest in the object (346) (e.g., the object that the user is currently looking at as determined by gaze detection within the 360 video). Assets are then prioritized for motion parallax (348). In some embodiments, the prioritization (348) may include basing the prioritization received from the client-side device, the HMD capabilities, and the QoS of the network, and/or the like. For example, the 3D model assets that cannot be rendered on the client-side device 310 may be lowered in priority and be represented in the 360 video without motion parallax. Additionally, some 3D models or portions thereof may be lowered in priority for motion parallax if the HMD device is connected to a slow or unreliable network, or otherwise has limited connectivity.

The server-side device 320 then prepares assets (350) for the motion parallax for the top priority objects. Example assets may include 3D models, 3D object patches, background patches, and 3D models for objects behind the priority objects. The 3D models are obtained for the interesting objects to be transported to the client-side for rendering. A 3D object patch is rendered for the 3D object of interest to be used in representation in a motion parallax effect. A background patch is a rendered background region for an object defined in a 3D model. The patch may be used as a background when the 3D object is rendered on top of the 360 video of the virtual world. The 3D models for objects behind the priority object may be provided by the server-side device to enable the client-side device to render and prepare a background patch for the object of interest.

The prepared assets (350) are transported (352) in the prioritized order in the background to the UX manager 312, that stores the assets to the local storage. The motion parallax is then presented at the HMD.

In some embodiments, representations of objects of interest are removed from the 360 video in the motion parallax mode. In other embodiments, patches are used for the objects of interest.

As shown in FIG. 3A, in some embodiments, the motion parallax effect may use a server prepared rendering of the 360 video without the 3D object of interest and a local rendering of the 3D object of interest. In response to the user looking at an object of interest, the HMD retrieves the prepared motion parallax assets from the local storage and prepares to present the motion parallax effect for the object of interest. Sensors 314 in the HMD device 310 detect the gaze-direction and head movement or position changes of the user (370). The UX manager 312 sends an activate motion parallax message (372) to the server-side device 320. A motion parallax mode is activated, and the 360 video frames are rendered without the object of interest (374). The server then delivers the 360 video stream (376), without the interesting object, to the UX manager 312 via the network connection.

The representation of the motion parallax effect is based on the gaze-direction and the position changes of the user (378), detected by the HMD sensors 314 and evaluated by the UX manager 312. Displaying the motion parallax effect (380) can include outputting the background video and outputting the object of interest. In some embodiments, the 360 video is displayed as background.

In some other embodiments, rather than a server prepared 360 video without the 3D object of interest (as in FIG. 3A), patches can be superimposed on the 360 video at the HMD to implement the motion parallax effect, as shown in FIG. 3B. For example, in some embodiments, a background patch can be superimposed on the 360 video background when the original 360 video stream is used as a background. The background patch(es) may depict a section or segment of the background of the 360 video that may be overlaid on the rendering of the 360 video to hide or "remove" a section or segment of the 360 video, such as a section or segment including the object of interest.

A background patch may be provided in various ways.

For example, in some embodiments, the client-side device performs the 3D rendering and produces a background patch for the object of interest. The client-side device uses the 3D models of the objects behind the object of interest and renders the background patch for the object of interest. The client-side device superimposes the prepared background patch into the 360 video background.

In some other embodiments, the client side device can use diminished reality techniques and produces a background patch for the interesting object. For example, using any available diminished reality technique, module, or software (such as discussed in Siltanen, S., "Diminished reality for augmented reality interior design", *The Visual Computer*, 2017, vol. 33, p. 193-208, and Kawai et al., "Diminished reality considering background structures.", 2013 *IEEE International Symposium on Mixed and Augmented Reality (ISMAR)*, 2013, p. 259-260), the client-side device can detect the representation of the object of interest in the background video and remove it from the video. In some embodiments, the client-side device may use background textures in the production of the background patch for the object of interest.

In some other embodiments, the server-side device may produce the background patch, which may then be used by the client device. As shown in FIG. 3B, in some embodiments, the server-side device may include any prepared patches in the assets for motion parallax (352) communicated to the client-side device. The client-side device may then use the background patch/patches the server-side device prepared, and superimpose the patch/patches into the 360 video background at the appropriate locations.

Whether a prepared 360 video without the 3D object of interest or background patches are used, the output of motion parallax (380 in FIG. 3A, 394 in FIG. 3B) may be performed by the client-side device 310 using various techniques to make the visual presentation of motion parallax to the user (382 in FIG. 3A, 396 in FIG. 3B). For example, outputting the object of interest may comprise the client-side device outputting the 3D model of the object of interest or outputting a patch of the object of interest over the background video. In some embodiments where the object of interest is output as a 3D model, the UX manager 312 may display the object of interest by rendering the 3D model of the object of interest stored in the local storage, accounting for displacement of the HMD device in addition to changes in the user's viewing direction. In some embodiments where the object of interest is output as a patch of the object of interest, the patch may be superimposed on the 360 video background to represent the selected 3D object with motion parallax emulated.

In some embodiments, the locations of the modules used in preparation of the motion parallax assets in FIGS. 3A-3B may be moved to the client-side device. For example, the representations of objects of interest may be removed from the 360 video at the client-side device 310 rather than at the server 320.

Some embodiments of the use of patches to in providing the motion parallax effect are shown in FIGS. 4A and 4B.

FIG. 4A depicts an example approach for providing a motion parallax effect in a HMD, in accordance with some embodiments. The approach in FIG. 4A is similar to the approach of FIG. 2, as discussed above. Here, the sphere 420 represents a 360 video with a complex 3D model 422. The 360 video 420 contains all content, as with current VR, and no motion parallax. Motion parallax assets (such as 3D models 426, and 3D patches 428) are prioritized, prepared, and transmitted from the 360 VR server 424 to the local storage 430. When providing the motion parallax effect for the 3D object, a background patch 440 (from the patch or patches 428) may cover the area with the 3D object in the 360 video. In various embodiments, the background patch 440 may be prepared at either or both of the client-side or server-side devices. A motion parallax client receives the, e.g., 3D model(s) (435) of the object of interest, and renders the 3D models to support the motion parallax effect. As shown in FIG. 4A, in some embodiments, the rendered object of interest may be in a location that is entirely within the area of the background patch 440, overlapping an edge of the background patch 440, and/or the like.

FIG. 4B depicts an example approach for providing a motion parallax effect in a HMD, in accordance with some embodiments. The approach in FIG. 4B is generally similar to the approach of FIG. 4A. Here, the 360 video 450 only contains background, and not a 3D rendering of the object(s) of interest. A client that is not capable (either through hardware or other limitations or restrictions) of rendering the 3D object(s) of interest receives patches to overlay representations of the object(s) (not shown) in the video 450. These patches 455 are overlaid on the locations of the objects of interest in the background in rendering of the motion parallax effect. As such, the objects of interest are shown in an updated position relative to their initial location, with the patches 455 including the relocated depictions of the objects of interest.

In some exemplary embodiments, systems and methods according to embodiments set forth herein may provide for output of synthetic 3D content in low-end HMD devices and in heterogeneous networks. Such exemplary uses may provide an automatic solution for providing content to different kinds of HMD devices.

In some exemplary embodiments, based on 360 video capture and a server-side 3D reconstruction, the server may deliver detected 3D objects to the client-side device for providing motion parallax for the detected objects. For example, a 360 video may be provided along with geometrical information for objects detected by the server in the video.

Figure 5A:
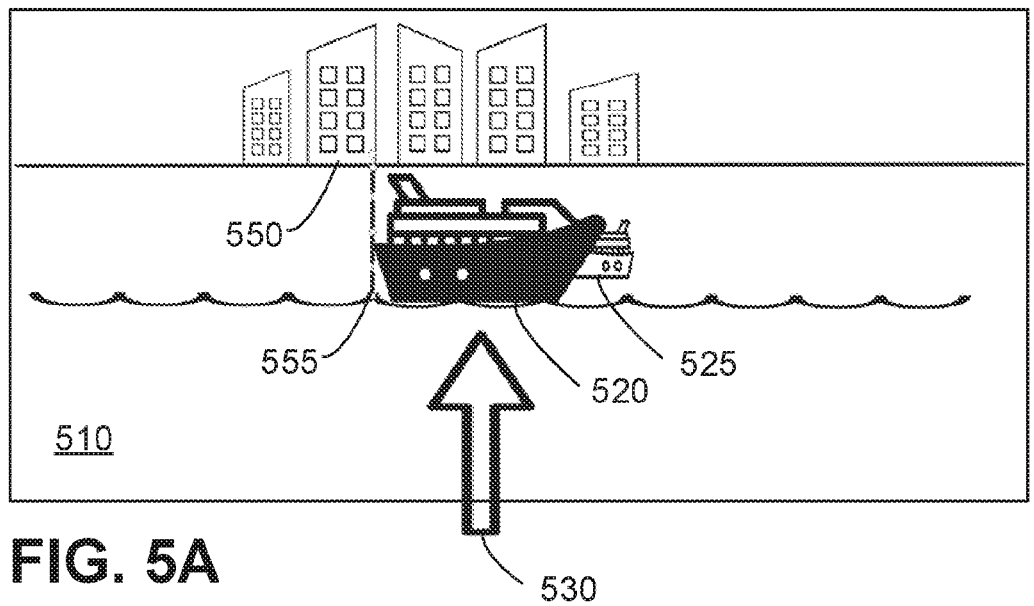
FIG. 5A depicts a first viewpoint of a 360-degree video, in accordance with some embodiments.

FIG. 5A depicts a first viewpoint of a 360 video, in accordance with some embodiments. In FIG. 5A, the 360 video 510 includes a background of a skyline, with a first boat VR object 520 in the foreground. Additionally, a second boat VR object 525 partially appears behind the first boat VR object 520. The view of the first boat VR object 520 for the user is straight on from a viewpoint 530. From viewpoint 530, the rear of the first boat VR object 520 aligns with building 550 in the skyline, as depicted by the dotted line 555.

Figure 5B:
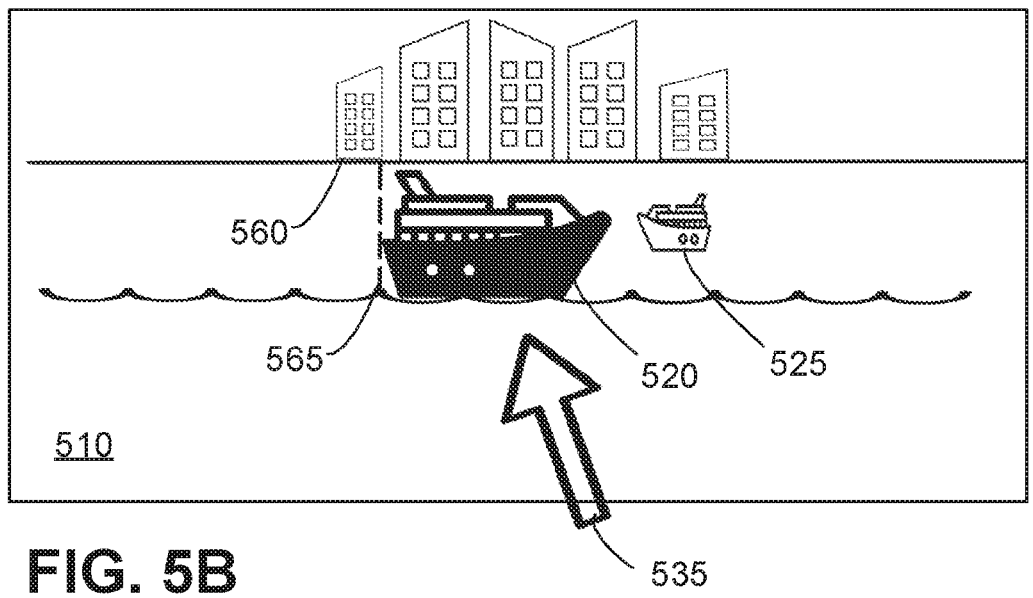
FIG. 5B depicts a second viewpoint of the 360-degree video of FIG. 5A, in accordance with some embodiments.

FIG. 5B depicts a second viewpoint 535 of the 360 video 510 of FIG. 5A, in accordance with some embodiments. In FIG. 5B, the viewpoint 535 is translated to the right relative to the viewpoint 530 of FIG. 5A (e.g., the user's head has moved to the right relative to its position for viewpoint 530). Here, the second boat VR object 525 appears fully to the right of the first boat VR object 520. The second boat VR object 525 was initially blocked from full view in the FIG. 5A, but because of the relative motion of the boats 520, 525 and the background 360 video from the enabled motion parallax effect, the enabled apparent motion results in boat 525 being fully visible from translated viewpoint 535.

As also shown in FIG. 5B, while the first boat VR object 520 remains in the center of the field of view of the user, the second boat VR object 525 and the skyline have shifted to the right. Because of the shift in user position to viewpoint 535, the rear of the first boat VR object 520 is now in line with building 560 in the skyline, as depicted by dotted line 565.

Figure 6A:
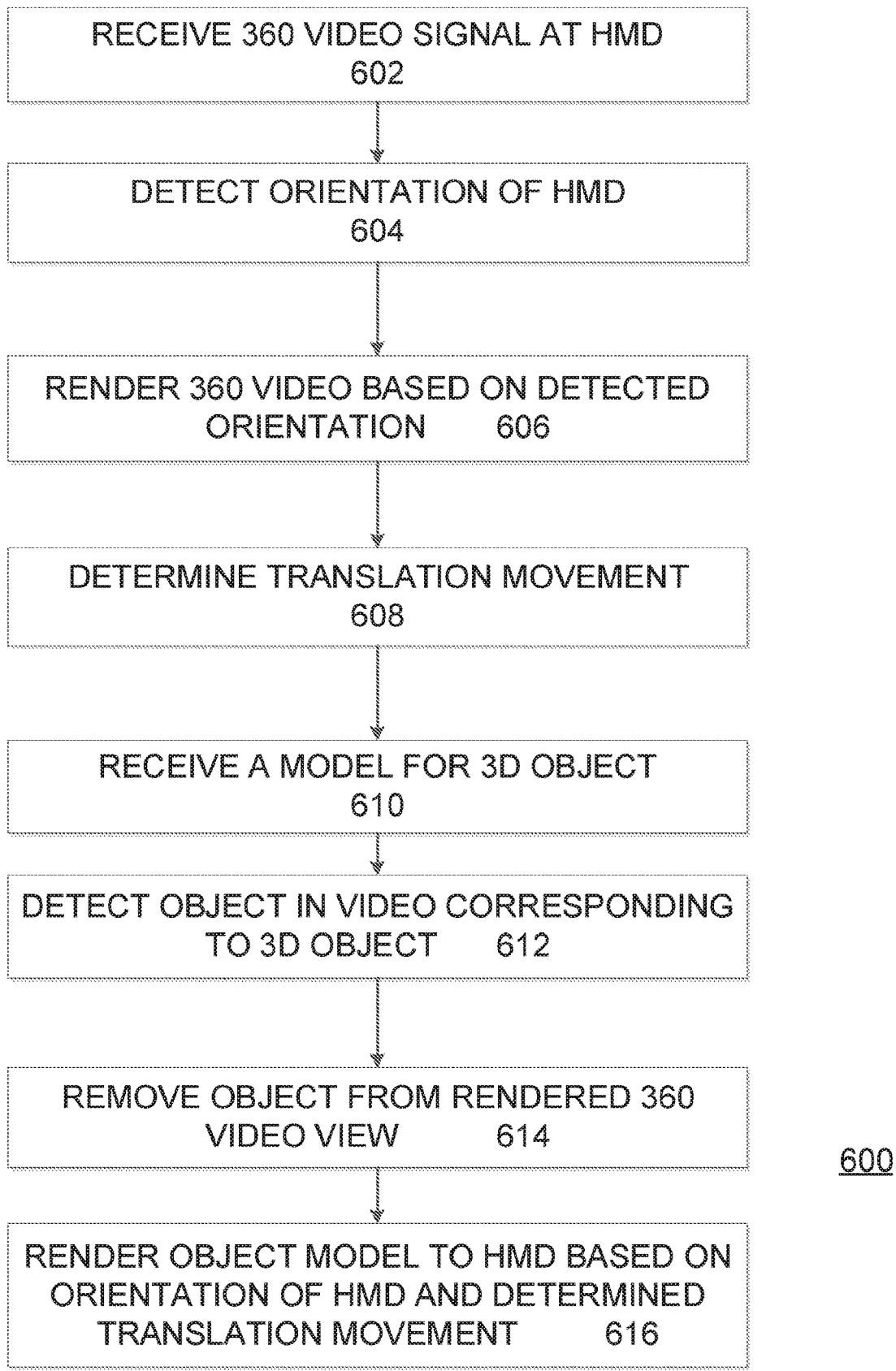
FIGS. 6A-6C depict example methods of displaying motion parallax, in accordance with some embodiments.
Figure 6B:
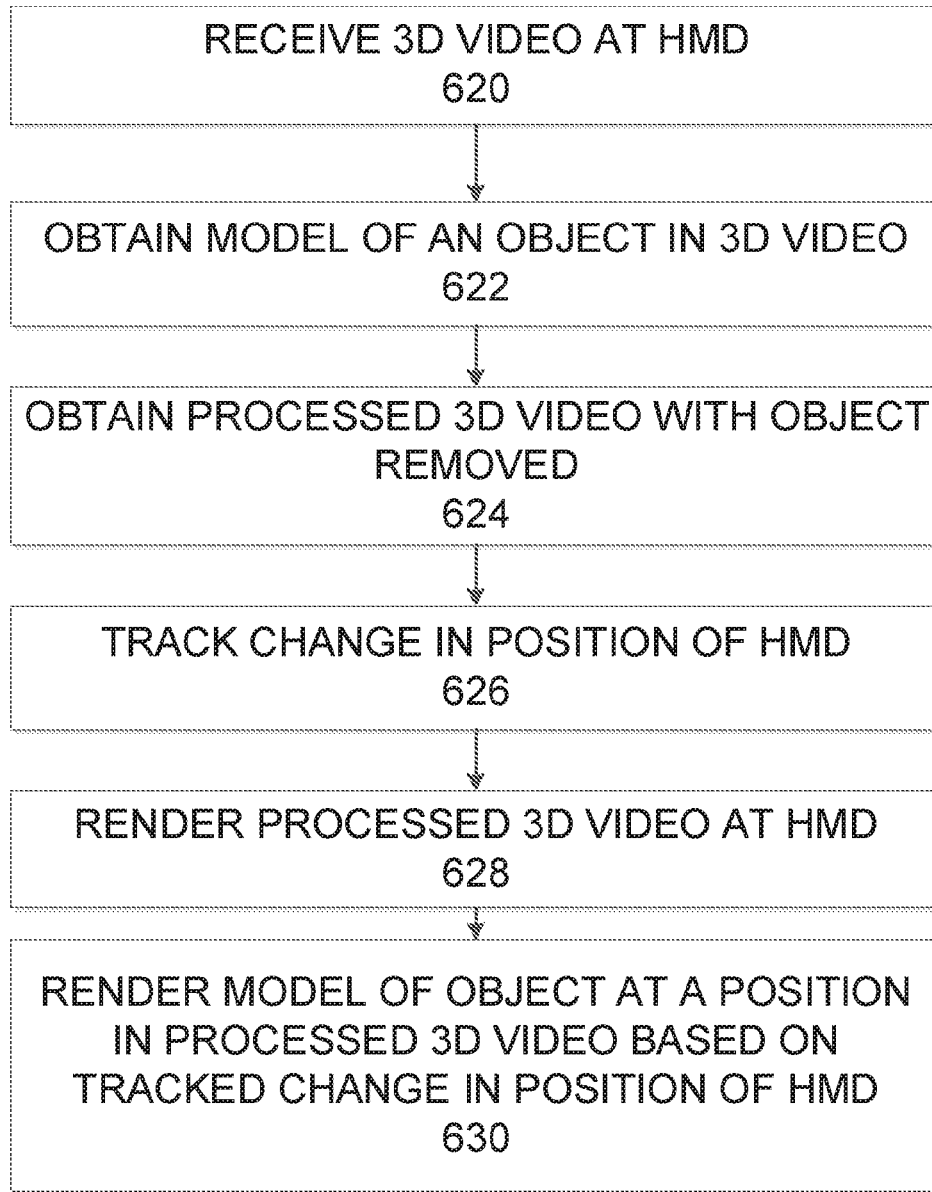
Figure 6C:
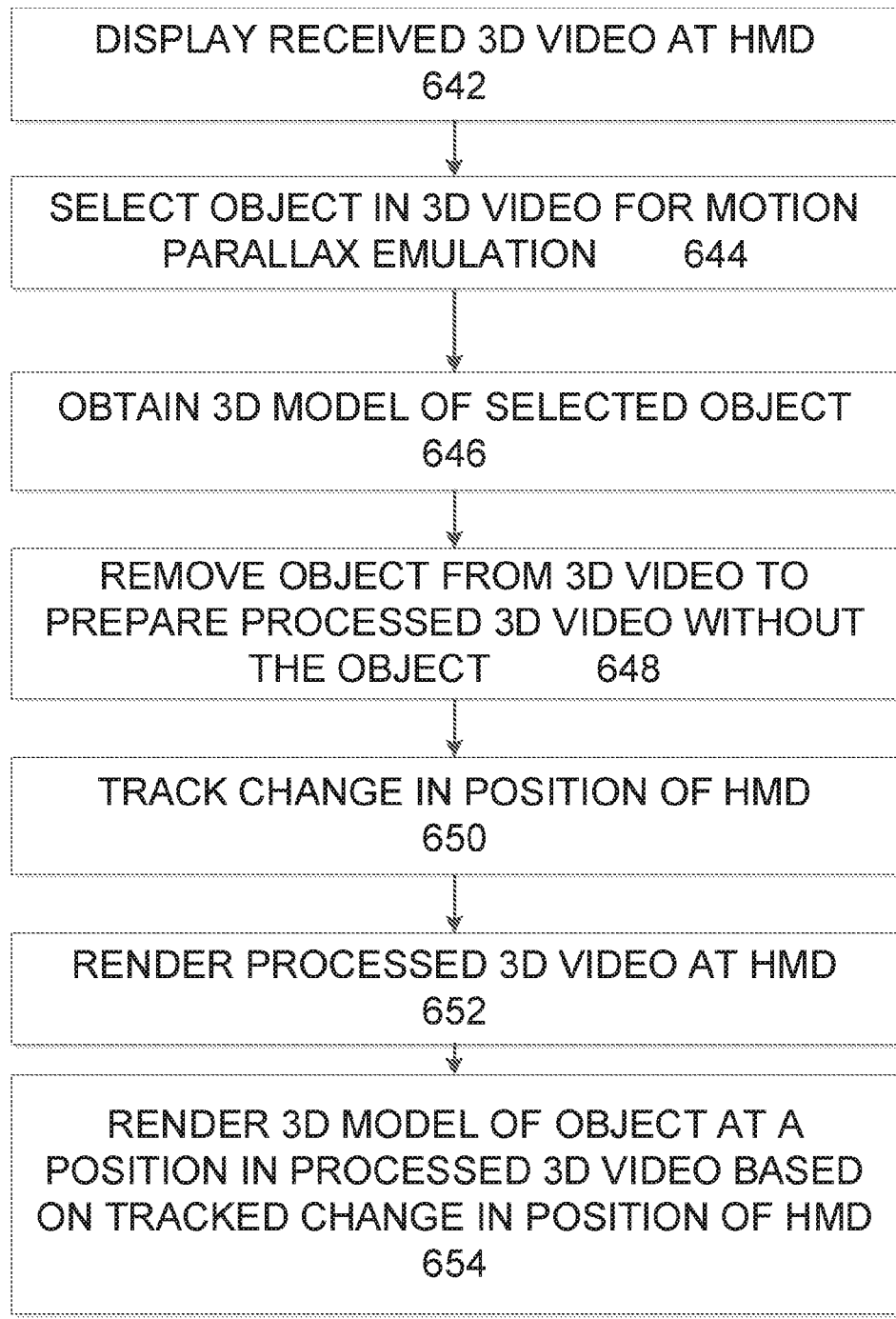

FIGS. 6A-6C depict example methods of displaying motion parallax, in accordance with some embodiments.

FIG. 6A depicts the method 600 that includes receiving a 360 video signal at the HMD device at 602. The orientation of the HMD device is detected at 604. The 360 video is rendered to a viewpoint based on the detected orientation of the HMD device at 606. At 608, translation movement of the viewer is determined, and a model for a 3D object is received at 610. An object corresponding to the received 3D object is detected at 612. The object is removed from the rendered 360 video view at 614. The object model is rendered to the HMD view based on an orientation of the HMD device and the determined translational movement of the viewer at 616. In some embodiments, removing the object as in 614 comprises receiving a spatial patch segment of the video and displaying the patch over the object. In other embodiments, removing the object comprises rendering the patch over the 360 video view.

FIG. 6B depicts an example method 618 that includes receiving a 3D video at a HMD (620). A model of an object in the 3D video is also obtained (622). A processed 3D video is obtained (624), in which the 3D video is processed to remove the object from the 3D video. A change in the position of the HMD by a sensor of the HMD is tracked (626). The processed 3D video is rendered at the HMD (628), and the model of the object is rendered (630) at a position in the processed 3D video based on the tracked change in position of the HMD.

FIG. 6C depicts an example method 640 that includes displaying a received 3D video at a HMD (642). An object in the 3D video is selected for motion parallax emulation (644). A 3D model of the object in the 3D video is obtained (646). A processed 3D video without the object is prepared by removing the object from the 3D video (648). A change in position of the HMD is tracked by a sensor of the HMD (650). The processed 3D video is rendered at the HMD (652), and the 3D model of the object is rendered (654) at a position in the processed 3D video based on the tracked change in position of the HMD.

In some embodiments, to emulate motion parallax, a HMD may receive a 360-degree video and a model of at least a first object in the 360-degree video. In some embodiments, the first object may be determined by a user interest evaluation, such as by monitoring a gaze direction of a user. In some cases, the relative virtual distance of objects from the user may factor in to selection of one or more objects of interest. The HMD may process the received 360-degree video to remove the at least first object from the 360-degree video. In some embodiments, the 360-degree video may be processed by rendering a patch segment over a location of the at least first object in the 360-degree video. In some cases, the patch segment may be prepared by the HMD, and in some cases the patch segment may be received at the HMD from a server. In some embodiments, the HMD may prepare a patch segment using one or more diminished reality techniques to detect, and then remove, a representation of the at least first object in the 360-degree video. For example, the HMD may use background textures of the relevant region of the video to produce a background patch for the at least first object. In some embodiments, the HMD may prepare a patch segment using models for one or more additional objects in the area of the first object. For example, additional objects may be visually behind the first object from the user's perspective. The HMD may receive these additional models from a memory or a server, and use the additional models in combination with the 360-degree video to prepare the patch segment for "removing" the first object from the rendered 360-degree video. In some embodiments, a prepared patch segment may be received at the HMD from a server.

At least one sensor of the HMD (such as a motion sensor, accelerometer, etc.) may detect and track a change in the orientation of the HMD. The processed 360-degree video with the first object removed may be rendered and presented to the HMD user. Additionally, based on the detected and tracked change in the orientation of the HMD, the model of the first object may be rendered at a new position based at least in part on the detected and tracked change in the orientation of the HMD. In these ways, motion parallax may be simulated with reduced render processing requirements on the HMD.

In accordance with some embodiments, the 3D video may comprise a multilayer spherical video, and the depths of objects of interest may be based on the depth layers of the multilayer spherical video.

In some embodiments, there is an example method for displaying imagery on a head mounted display (HMD) device achieving motion parallax, the method comprising: receiving a spherical video signal at the HMD device; detecting the orientation of the HMD device; rendering the spherical video to a view based on the detected orientation of the HMD device; determining translation movement of the viewer; receiving a model for a 3D object; detecting the object in the spherical video corresponding to the 3D object model; removing the object from the rendered spherical video view; and rendering the received 3D object model at the HMD device based on the orientation of the HMD device and the determined translational movement of the viewer. The method may include wherein the object is removed by using a patch segment of video supplied by a server. The method may include wherein the patch segment is a spatial patch segment. The method may include wherein removing the object comprises rendering the patch over the object in the spherical video.

In some embodiments, there is an example method comprising: detecting user interest in a virtual reality (VR) 3D object in a spherical video displayed via a head mounted display (HMD) device; determining translational movement of the HMD device; removing the 3D object from the spherical video; rendering a limited-sized 3D object; and displaying the limited sized 3D object in the spherical video in relation to the determined translational movement of the HMD device. The method may include wherein the 3D object is removed by using a patch segment of video supplied by a server. The method may include wherein the patch segment is a spatial patch segment. The method may include wherein removing the 3D object comprises rendering the patch over the object in the spherical video. The method may include wherein the rendering of the 3D object is done based on determining the 3D object is at a determined visual distance from the user. The method may include wherein the rendering of the 3D object is done based on determining a user's level-of-interest in the object. The method may include wherein the rendering of the 3D object is done based on a visual complexity of the object. The method may include wherein the rendering of the 3D object is done based on determining sufficient network resources that are available between the HMD device and a VR server. The method may include wherein the spherical video is rendered at a remote VR server and received by the HMD device. The method may include wherein the spherical video is provided to the HMD device via a wireless network connection. The method may include wherein detecting user interest in a 3D object comprises determining a user's gaze direction. The method may further comprise rendering a patch for the 3D object and displaying the patch. The method may further comprise rendering a background patch for the 3D object and displaying the background patch. The method may further comprise providing a second 3D model for a second 3D object located visually behind the 3D object.

In some embodiments, there is a system for displaying virtual reality, the system comprising: a VR server and a client-side VR device. The VR server may comprise: a spherical video rendering module configured to render a spherical 3D video; an asset prioritization module configured to prioritize object to display in motion parallax; and an asset preparation module configured to prepare motion parallax assets for the prioritized objects. The client-side VR device may comprise: a gaze-direction sensor configured to detect a user's gaze location; a position-change detection sensor configured to detect a translational movement of the user; a 3D object prioritization configured to determine an initial priority of 3D objects to prepare for parallax motion; a performance analyzer configured to determine HMD properties; a network analyzer configured to determine network performance characteristics; a local asset storage; and a 3D rendering module configured to render 3D objects for display. The system may include wherein the VR server provides a spherical video stream, 3D object descriptions, and motion parallax assets to the client-side VR device. The system may include wherein the client-side VR device provides 3D object prioritization, HMD properties, and network parameters to the VR server.

In some embodiments, there is a device server including a non-transitory computer readable medium for carrying one or more instructions, wherein the one or more instructions, when executed by one or more processors, causes the one or more processors to perform the steps of: receiving a spherical video signal at the HMD device; detecting the orientation of the HMD device; rendering the spherical video to a view based on the detected orientation of the HMD device; determining translation movement of the viewer; receiving a model for a 3D object; detecting the object in the spherical video corresponding to the 3D object model; removing the object from the rendered spherical video view; and rendering the received 3D object model at the HMD sdevice based on the orientation of the HMD device and the determined translational movement of the viewer.

Producing Multilayer Spherical Video.

In cinematic VR embodiments, the viewpoint may be limited to one single static viewpoint position. Discrepancy between a user's real head motion and a fixed location of the viewpoint of the cinematic VR can break down the illusion of immersion and may cause, for example, cyber sickness.

Motion parallax, such as in the visual perception of objects at different distances moving at different speeds relative to each other, has been proven to be a stronger depth cue than stereopsis, and thus is often a substantial part of how people perceive the dimensions of their surrounding reality. Cinematic VR experiences may benefit from accommodating user head motions, such as being able to change viewpoint location in addition to orientation according to the actual head motion of a viewer, thereby recreating correct motion parallax when a user moves their head away from a fixed position.

In some instances, limited bandwidth and latency of data connection between viewer clients and content servers and limited computing performance of client devices (or any other reasons to restrict or distribute computing requirements between a client device and a server) may impose constraints on the use of such next generation cinematic VR content, as freedom to move inside captured VR content often comes with extremely large memory consumption and heavy computing requirements.

One approach to addressing these shortcomings is multilayer spherical video. In multilayer spherical video, a captured true 3D cinematic VR scene is segregated into a number of layers based on the depths of visual elements. Motion parallax of the scene can be approximately recreated with non-uniform motion of the segregated video layers according to the user's head motion. Transforming a true 3D scene to a multilayer spherical video can enable more efficient data transmission and playback on devices with limited computing power (or otherwise restricted or desired to be distributed).

In some embodiments, a multilayer spherical video may be created, for example, using monoscopic 360 video cameras readily available to the average consumer, rather than more complex systems. Multilayer video enables motion parallax according to a user's head movements within a limited area within the captured spherical/360 video content. In some embodiments, the scene as a whole can be approximately divided into a static environment or its dynamic elements. The process is similar to the content structure often used in real-time 3D games, where indoor scenes are divided into a static environment model into which dynamic moving elements such as game characters are added separately. In 3D games, this division allows complex global lighting to be pre-rendered for the static environment, whereas dynamic objects are rendered with different rendering methods better addressing, for example, real-time requirements, if any. In some disclosed embodiments, the division of content capture for static and dynamic parts allows combination of different kinds of capturing procedures, as well as different approaches for solving the missing depth information from the captured content.

In some embodiments, the capturing is performed in two separate steps. In one step, the static environment is captured without any moving elements. In a second step, the final scene with all the moving elements is captured. The process transforming this content captured in two steps into a multilayer spherical video is also executed as two separate phases. The steps of capturing and processing of the static environment and capturing and processing of the actual scene with all the dynamic elements is described in detail below.

Static environment capture. A 360 camera is moved around in the static environment alone. The area where the 360 camera will be placed at the final scene capturing phase is covered more densely to ensure good accuracy of the environment depth estimations from the whole area where the motion parallax is intended to be supported in. Other areas of the static environment can be covered more sparsely, focusing on areas where the dynamic elements will be placed.

During the static environment capture, the 360 camera records images of the environment with multiple exposure values. This enables extension of dynamic range beyond what can be captured in one single image alone. A 3D model of the static environment is created using structure from the motion approach. Next, an array of high dynamic range environment maps is created within the environment.

Capture of the scene together with the dynamic elements. The 360 video camera captures the scene with the dynamic elements. Each frame of the captured 360 video is processed. The camera location relative to the 3D reconstruction of the static environment is registered. The closest matching camera image captured in the static environment capture phase with the closest exposure value is selected. Dynamic elements from the captured data are isolated by comparing them with the selected closest matching image. Shadows areas from the captured data are detected, and the dynamic object areas are segmented without the shadows.

An average depth for the dynamic object areas is found, with a depth detection based on lighting comparison through differential rendering. To do this, a dummy geometry is created, the geometry matching the shape of the dynamic object area as seen on the image. The scale and distance of the dummy geometry is varied to simulate how that dummy geometry changes the lighting of the reconstructed 3D model of the environment, e.g., where shadows are cast, with each size/distance variation. Lighting simulation results produced with differential rendering approach are combined with the captured image of the static scene. The static environment image augmented with shadows cast by dummy geometry at different distances is compared with the frame captured from the dynamic scene.

The static environment image augmented with the dummy geometry shadows that has the least amount of visual discrepancy with the captured dynamic scene frame gives the best approximation for the dynamic element distance. The distance used by the dummy object for the best match is assigned as the average depth for the dynamic element area in the captured frame.

In some embodiments, once depth values have been assigned for all dynamic elements in the captured frame, the rest of the captured frame is considered static background and depth values for it are assigned from the 3D model of the environment reconstructed in the first phase. The captured frame is divided into a number of different depth layers based on the depth values.

In some such embodiments, the 3D reconstruction of the environment enables depth estimation for dynamic objects through lighting simulation and differential rendering. Depth of the dynamic objects can be estimated by recreating shadows they would cast at different distances from the camera using dummy geometry and 3D reconstruction for rendering.

In some embodiments, creation of cinematic VR content is enabled with, for example, existing commodity monoscopic spherical cameras so that motion parallax is enabled. This process enables creation of multilayer spherical videos with normal existing 360 cameras. Multilayer spherical videos enable approximate recreation of the motion parallax on the playback of the content.

In some such embodiments, the static environment and scene with the dynamic moving elements are captured and processed in two separate phases. At the processing of the captured data, depth can be estimated for the captured visual elements. Estimated depth values drive the segregation of the spherical video to a number of layers, which in turn enable reproduction of motion parallax when content is displayed.

When cinematic VR experience is captured with a two-phase approach, the captured content may be processed to produce a multilayer spherical video which contains not only a cinematic VR experience seen from one single viewpoint, but enables motion parallax from an area around the camera viewpoint which was used in the second, dynamic, capturing phase.

The capturing of the cinematic VR experience is executed in two separate phases, first capturing the static environment and then capturing the scene with all the dynamic elements. The first phase of capturing the static environment is executed by moving the camera around in the environment clear of the dynamic elements. In the second phase the scene is captured normally with the spherical camera placed within the action for a viewpoint defined by the director and all dynamic elements present. The dynamic elements may include actors and/or any other moving objects in action while recording with the camera.

In the first phase, the static environment is captured by moving a 360 camera around in the environment. While the environment is scanned by moving the camera, the camera is set to continually take images at different exposures by changing the shutter speed. By varying the shutter speed, the same view of the environment is captured with various dynamic ranges. The combinations of these different areas of dynamic range images can then be combined at the content processing phase in order to compose high dynamic range (HDR) images of the environment from different locations. In order to be able to take images from very close viewpoint location to each other with different exposure values, the camera is set to iterate through different shutter values. The motion of the 360 camera needs to be slow enough not cause too big of a motion between images with different exposures. For the static environment capture, the scene is cleared from the dynamic elements and includes elements with minimal motion or change in appearance, such as indoor scene with constant lighting.

In some embodiments, in the capture of the static environment, the area where the camera is to be placed at the final scene capturing phase is covered more densely to ensure good accuracy of the environment depth estimations from the whole area where the motion parallax is intended to be supported in. Other areas of the static environment may be covered more sparsely, focusing on areas where the dynamic elements are going to be placed at.

In the second phase, the full scene is captured with a 360 camera in the same environment which was captured in the first static environment capture phase. In this capturing phase, the camera is placed at a static viewpoint, selected by the director to be, for example, an optimal viewing position to the action taking place in the scene. Camera movements are also possible to perform while capturing the dynamic scene and these camera motions will cause the viewpoint to move in the final content shown to the viewer, which might not provide, for example, a best possible, or optimal, end-user experience as the depth of segregated layers will change. In practice, the order in which the static and dynamic capturing phases are carried out does not matter.

As with capturing, the content processing, in accordance with some embodiments, may also be executed in two phases. In the first phase, the static environment geometry is reconstructed and an array of high dynamic range (HDR) environment maps are created. In the second processing phase, dynamic elements are separated from the static environment, and depth values are estimated for these dynamic elements. Using the depth values of the static environment and estimated depth of dynamic elements, video material is segregated into a number of spherical video layers based on the depth values.

Figure 7:
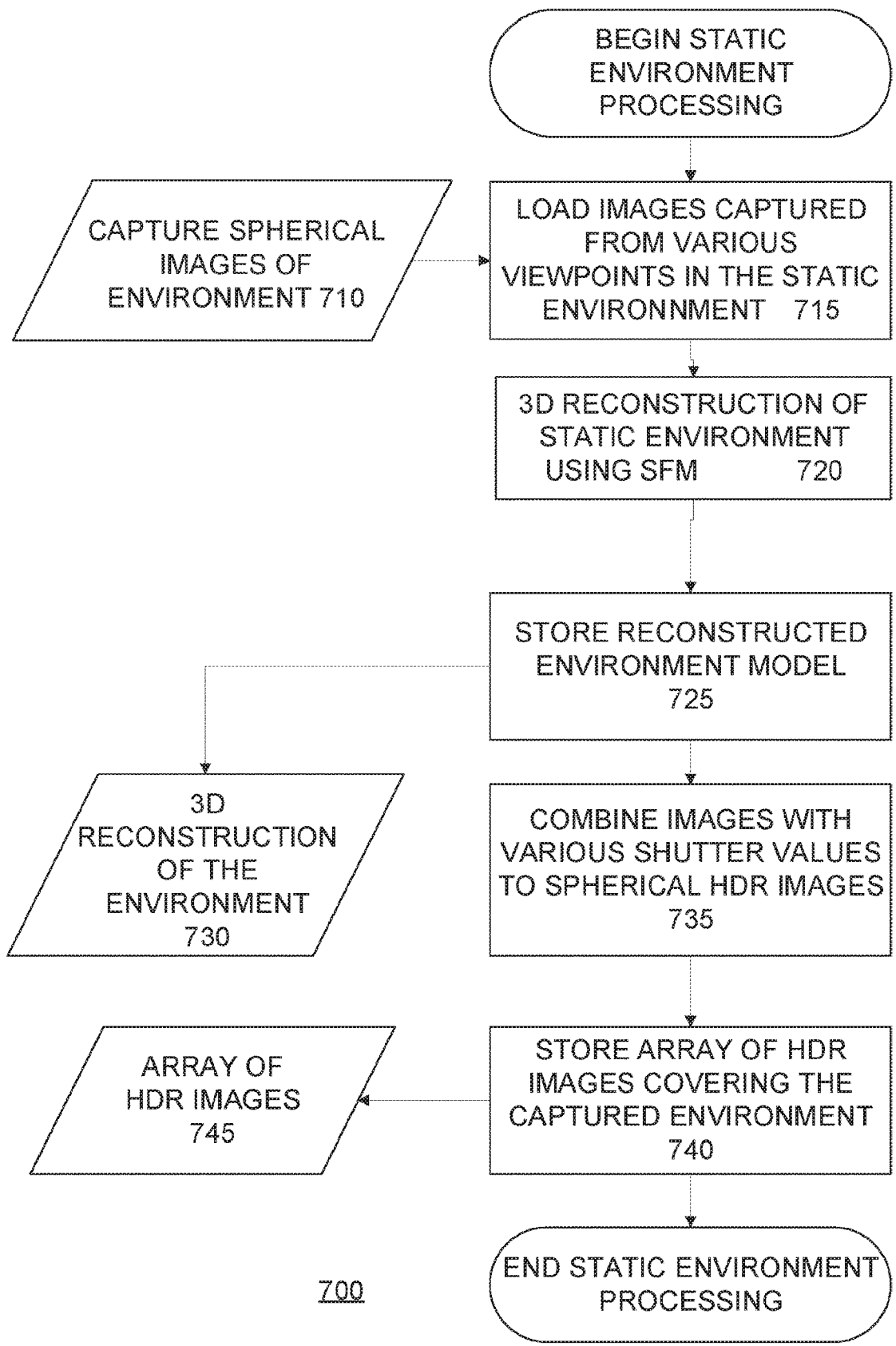
FIG. 7 depicts an example method of a static environment processing phase, in accordance with some embodiments.

Static Environment Processing. FIG. 7 depicts an example method 700 of a static environment processing phase, in accordance with some embodiments. With the spherical images of the environment captured (710), as discussed above, the images which were captured from the various viewpoints in the static environment may be loaded for processing (715). The static environment processing may be performed to create a 3D reconstruction (720) of the static environment, as well as to create an array of HDR (745) images covering the static environment in areas where dynamic content will be placed and the area where a dynamic scene will be captured.

A 3D reconstruction of the static environment can be created from the images captured from different locations using structure from motion (SfM) approach (720). SfM is a collection of computer vision approaches that can be used to create a 3D model containing geometry and textures from a collection of still images or captured video frames of an object or environment. Well know solutions using SfM for constructing 3D models from collection of images include VisualSfM and Agisoft Photoscan. Some implementations of SfM are discussed in Guan et al., *"Structure-From-Motion in Spherical Video Using the von Mises-Fisher Distribution", IEEE Transactions on Image Processing*, 2016.

The 3D reconstruction (730) produced with the SfM approach provides depth values for the static background. The depth values for static background are sampled from the 3D reconstruction in the dynamic scene processing phase for providing depth for all areas of the captured dynamic scene that do not include dynamic elements. In the dynamic scene processing phase, the captured frames are segregated to several layers based on depth values. A secondary use for 3D reconstruction is to be used in assisting the 3D camera tracking, whenever a selected tracking method can use 3D reconstruction in the tracking. For these purposes, the 3D reconstruction is stored (725) to be available as an input for the processing done in the dynamic scene processing phase.

In addition to using captured images from the environment for 3D reconstruction, the processing also compiles images taken from the same location with different exposures to HDR images (735). Spherical HDR images are used in the dynamic content processing phase for detecting dynamic elements in the visual data and also to enable efficient physically plausible shadow rendering used for detecting the 3D location of the dynamic elements detected from the dynamic content video. The process stores composed HDR images (740) as an array of HDR images (745) to be available for the dynamic content processing phase together with the location information from which viewpoint the HDR image is taken.

Figure 8:
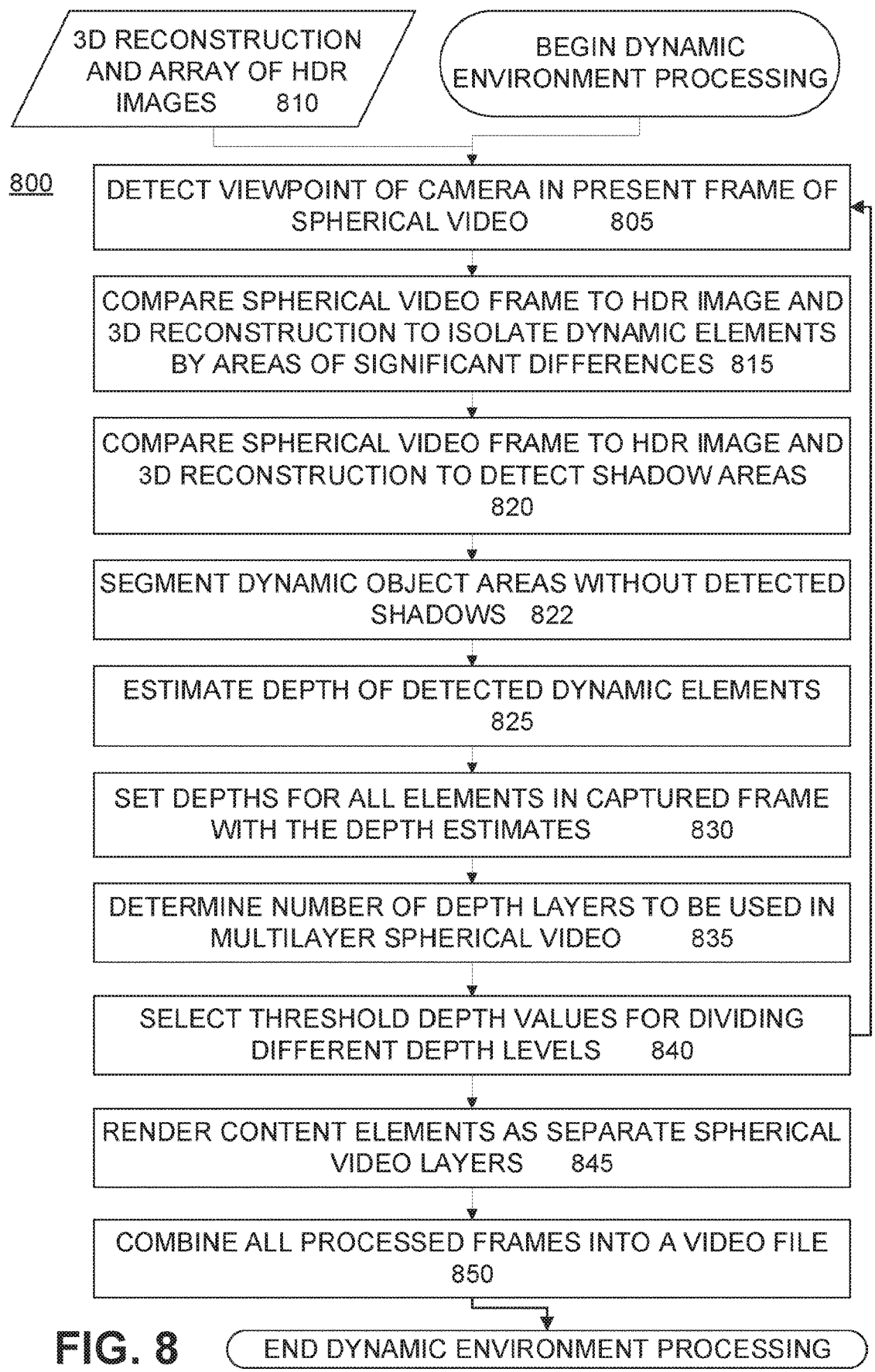
FIG. 8 depicts an example method of a dynamic environment processing phase, in accordance with some embodiments.

Dynamic Content Processing. FIG. 8 is flow chart showing an example process 800 of a dynamic environment processing phase, in accordance with some embodiments. Dynamic content processing divides content into a number of depth layers that can enable recreation of the motion parallax on the content playback. After the static environment processing phase has been executed, a dynamic content processing phase can be executed. In the dynamic content processing phase, the frames of the captured spherical video with all the dynamic elements are processed. The process of the per-frame processing comprises: camera location registration, dynamic element detection, depth estimation for the dynamic elements and layer segregation. In some embodiments, these steps may be executed for each frame of the spherical video as explained below.

Processing of each spherical video frame begins by detecting the viewpoint of the camera used in the particular frame (805). It should be understood that this camera registration can be performed using any visual 3D tracking approach as applicable in which, for example, both the 3D reconstruction of the static environment and collected HDR images (810) can be used for assisting the registration.

Dynamic elements are isolated from the spherical video (815) by comparing the captured frame with the HDR image of the static environment and 3D reconstruction using, for example, techniques such as those described in Sand and Teller, "Video Matching," *ACM Transactions on Graphics* 22, 3, 592-599, 2004. In addition to detecting areas in the captured frame that contain significant differences as compared to images from the static environment and 3D reconstruction, areas of differences caused by shadows may also be detected (820). Dynamic objects visible in the captured frame can cause a difference in the visual information with its shadow, in addition to the image area containing the actual dynamic element. Some techniques of shadow detection are discussed in Prati, et al., *"Detecting moving shadows: algorithms and evaluation", IEEE transactions on pattern analysis and machine intelligence,* 2003, 25.7: 918-923. In some embodiments, rather than by comparison of the dynamic and static frames, methods can be used for shadow detection from a single captured frame such as, but not limited to, those discussed in Khan, et. al., *"Automatic shadow detection and removal from a single image," IEEE transactions on pattern analysis and machine intelligence,* 2016, 38.3: 431-446. It should be understood that shadow detection may be performed using any of a variety of suitable techniques. The isolated dynamic object areas may be segmented to remove the detected shadow areas, leaving the detected dynamic elements (822).

The depth of the detected dynamic element may not be directly estimated from the 2D visual data contained in the captured spherical video frame. The direction from the camera to the dynamic element and shape of the dynamic element are known from the captured frame, but the element's depth from the camera is not directly known. However, since the optical characteristics of the spherical image are known, the relation between dynamic elements distance and size on the captured frame are also known. Using these known elements, and/or other data, the depth values for detected dynamic elements may be estimated (825), as discussed more fully below.

Layer Segregation. After the depth has been estimated for the detected dynamic elements in the captured frame, depths for all elements in the captured frame are set with the estimates (830). Areas of the captured frame not detected as dynamic elements are expected to represent the static environment, the depth of which can be derived by sampling the 3D reconstruction from the location registered as the camera location.

In some embodiments, based on the estimated depth values, particularly on the range and variation of depth values in the current frame of the scene, the number of different depth layers that may be needed for recreating motion parallax can be estimated (835). For acceptable motion parallax recreation, only motion parallax that the visual perception of the viewer can detect needs to be recreated. Motion parallax caused by depth variation which is sufficiently small that the resulting motion parallax is not perceivable by the viewer can be removed without decreasing the quality of experience. In some cases, even more perceivable motion parallax from larger depth variation may be removed with limited, negligible, or minimal impact on the overall quality of experience. The amount of motion parallax and associated depth variation that is acceptable to omit can be based on experimental approximation of the thresholds for human visual perception, or it may be based on a predetermined parameter determining what levels of motion parallax may be omitted. These levels of motion parallax can then be used to determine the number of depth layers for recreating motion parallax. The number of different depth layers to be used can also be forced or limited by external constraints, such as a maximum number of layers supported by the rendering system, or the like.

After the number of layers to be used is determined, the threshold values for depth values used for dividing the content to different depth levels is selected (840). The threshold values are chosen so that as much of depth variation for each time step of the content is sufficiently maintained while adjusting the depth layer division to depth areas that are as clear as possible, without major elements of content. When the depth threshold values have been chosen, the server renders content elements as separate spherical video layers (845).

During rendering, portions of the areas occluded by an element in the foreground are recorded. In the captured spherical video, objects in the foreground can occlude background so that not all visual content from the background occluded by the element in the foreground can be restored. In these cases, the rendering process combines information from HDR images captured in the static environment processing phase and 3D reconstruction to fill up background areas occluded by visual elements closer to the camera.

In some embodiments, when motion parallax is enabled, an area of the background occluded by the foreground elements changes according to the changes in the viewpoint and therefore as much of the background should be available as possible. In some embodiments, a content server scales the segregated layers according to the average depth of the layer, thus extending the area where the motion parallax can be recreated.

With this approach, depth threshold values for each time step of the content are solved, and a spherical video frame is divided to different layers according to the depth of the elements and layers are stored together with the average depth values of each layer.

Multilayer video compression and storage. After the frames of the captured spherical video are processed, the individual processed frames are combined into a video file (850). The individual layers may be stored as separate video files or file format enabling several layers of video information can be used. When frames are packed as a video file, it should be understood that the data can also be compressed using any video data compression approach.

In some embodiments, the scene comprising the dynamic elements is captured and the content is streamed in real-time. In some such embodiments, the static environment is captured and processed as a pre-processing step, and the spherical video may be captured in real time. During the capturing, frames are processed and streamed. The static environment capturing and processing is completed prior to capturing the spherical video with the dynamic elements. Also, the dynamic content processing may further comprise creating a real-time video stream and distributing that stream to the rendering clients.

Furthermore, in some instances, the processing to execute the dynamic content processing may be too processing intensive to be done in real-time. To resolve this, in some embodiments the camera location may be defined in the dynamic scene capture beforehand, removing the need for separate camera registration for each captured frame. Further, approximation of dynamic element distances may be provided to limit the range of different depths needed to test during run-time.

In some embodiments, an array of HDR images is created to be used for rendering the proxy geometry for depth recognition. In variation on the solution, instead of using HDR images, a more complex lighting model describing the locations and properties of the light sources in the environment as 3D entities can be created.

In some such embodiments, a multilayer spherical video for use with cinematic VR content is created. In one variation, dynamic elements from the spherical video are identified, and separate spherical video layers are created for them while separating dynamic elements from the static background. The multilayer spherical video in which the dynamic elements are separated from the static background may be used as augmented reality (AR) content. The depth information for each produced spherical video layer is known. This depth information may be used to create motion parallax effects for AR content.

In some embodiments, the depth estimation of the detected dynamic areas is assisted with computer vision approaches such as a deep learning model trained with the existing 3D video sequences.

Depth Estimation. As noted above, during the dynamic environment processing 800, the depths of detected dynamic elements may be estimated. Various approaches may be used for the estimation in different embodiments.

The size of the 2D projection of a 3D element depends on the size and distance of the object from the viewing point and the perspective projection used for transforming the 3D view to a 2D image. In traditional cameras, a perspective projection is a result of lenses guiding light from the scene to an image sensor or film. In theory, the relation between distance and how big an object appears on the 2D image plane when using a particular perspective projection is dictated by the field of view of the perspective projection. Within the case of spherical video, the field of view used by the projection is theoretically 360 degrees. However, the spherical images produced by 360 cameras may be stitched together from multiple images captured by multiple sensors and then projected with equirectangular or other projection from several 2D images captured to different directions to a single 2D image. Thus, the projection matrix and therefore the relation between object distance and size is not directly solved mathematically without sampling the actual images produced by the camera.

The approach of camera calibration often used in various computer vision solutions can be used to solve the projection properties of the 360 camera and therefore to solve the relation between distance and size of the object appearing on the image. One approach for camera calibration is to capture several images with the camera of a calibration target that has known geometric properties (often a black and white checkerboard), and to then analyze these captured images to solve for the projection properties created by the combination of the particular lens, sensor of the camera, and post-processing performed on the images.

A camera matrix produced by the camera calibration defines the projection which maps 3D points from the real-world view to 2D points on the image plane of the camera. If the depth of the 3D point is known, the inverse of the camera matrix can be used for projecting 2D image points back to the 3D points in the real world. In cases when the distance from camera to object is known, this can be used to measure size of objects in the images taken with a calibrated camera. In the case of this solution, the original distance of dynamic objects is unknown. However, when distance is approximated, the inverse of the camera matrix gives the locations of the object boundary points along horizontal and vertical axis correctly for that approximated distance. The boundary with the 3D locations resulting from this back projection are then used for generating a 3D shape which is then used for simulating the effect on the lighting.

Figure 9:
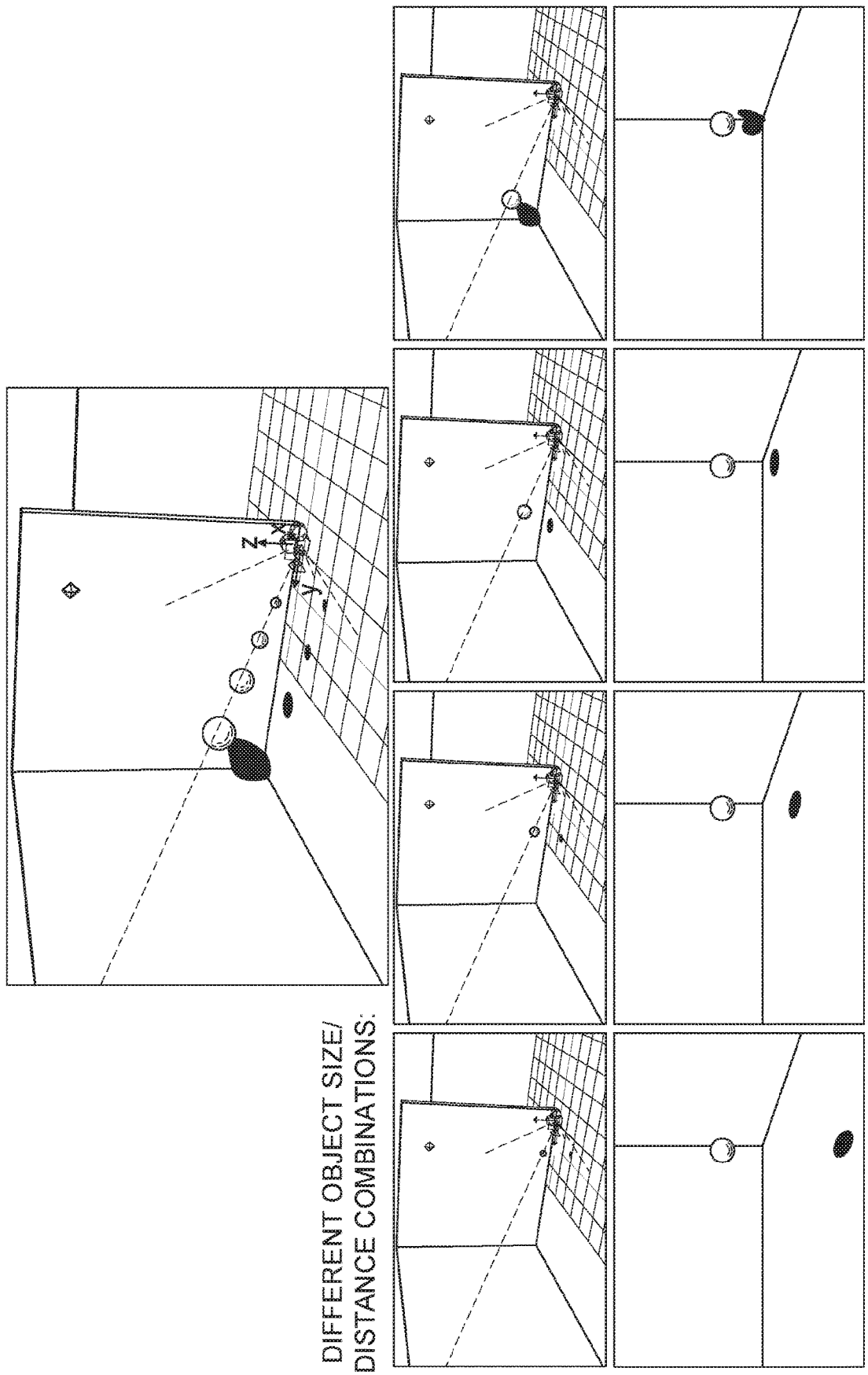
FIG. 9 depicts an example process of capturing dynamic elements in a video frame, in accordance with some embodiments.

FIG. 9 depicts several images illustrating how dynamic elements may appear in a captured video frame, in accordance with some embodiments. For simplicity, the camera images depicted in FIG. 9 are illustrated with a normal camera field of view rather than that of a spherical camera. However, since the relation of the distance to the object scaling on the image plane is relative to the projection used by the camera, the factor of scaling changes when the camera is a spherical camera instead of a traditional camera. In the top image, a sphere is depicted at four different distances from a camera, each different location having a different size of the sphere. In the middle row, the four images depict each size and distance combination from the top image alone, while the images in the bottom row depict how each of these different sphere location and size combinations appear identical as seen by the camera. Only shadow cast by each sphere changes as the camera captures the scene with different sphere locations and sizes.

In accordance with some embodiments, the relation between an object size and distance (for example, as discussed in relation to FIG. 9) is used to test how a dynamic element at different distances would impact the overall visual appearance of light interacting with other objects in the scene. By simulating how an approximation of the dynamic object at different distances would cast shadows in the environment and comparing these simulation results with the actual frame captured from the dynamic scene, the approximate (or estimated) distance (e.g., depth) of a dynamic element can be determined.

In some embodiments, the lighting simulation is a differential rendering process. In the process, a created dummy geometry is placed in the 3D reconstruction of the environment, and the light transportation from the light sources is simulated. A model for the environment lighting used by the simulation is retrieved from the HDR images captured approximately at the area where the dummy geometry is placed. In the light transport simulation, the dummy geometry blocks some part of the light from the light sources from reaching areas of the static environment reconstruction. Thus, some areas appear darker as they are in shadow cast by the dummy geometry. These variations in the lighting are collected by the differential rendering as observed from the viewpoint of the camera used to capture the dynamic scene frame. The shadows cast by the dummy geometry at the particular distance are added to the static environment image as seen from the position of the camera.

When all desired dynamic element distance (e.g., depth)/scale variations have been executed for one iteration and resulting images, produced by the combining of the differential rendering and HDR images of the static scene, have been produced, the created simulation results are compared with the captured frame of the actual dynamic scene. Based on the resulting combination images of this differential rendering process (e.g., determining the difference to the scene caused by the presence of the dummy geometry at a particular location), the depth/scale variation producing the most similar visual appearance can be selected as the best estimate for the actual distance of the dynamic element in the scene.

Figure 10:
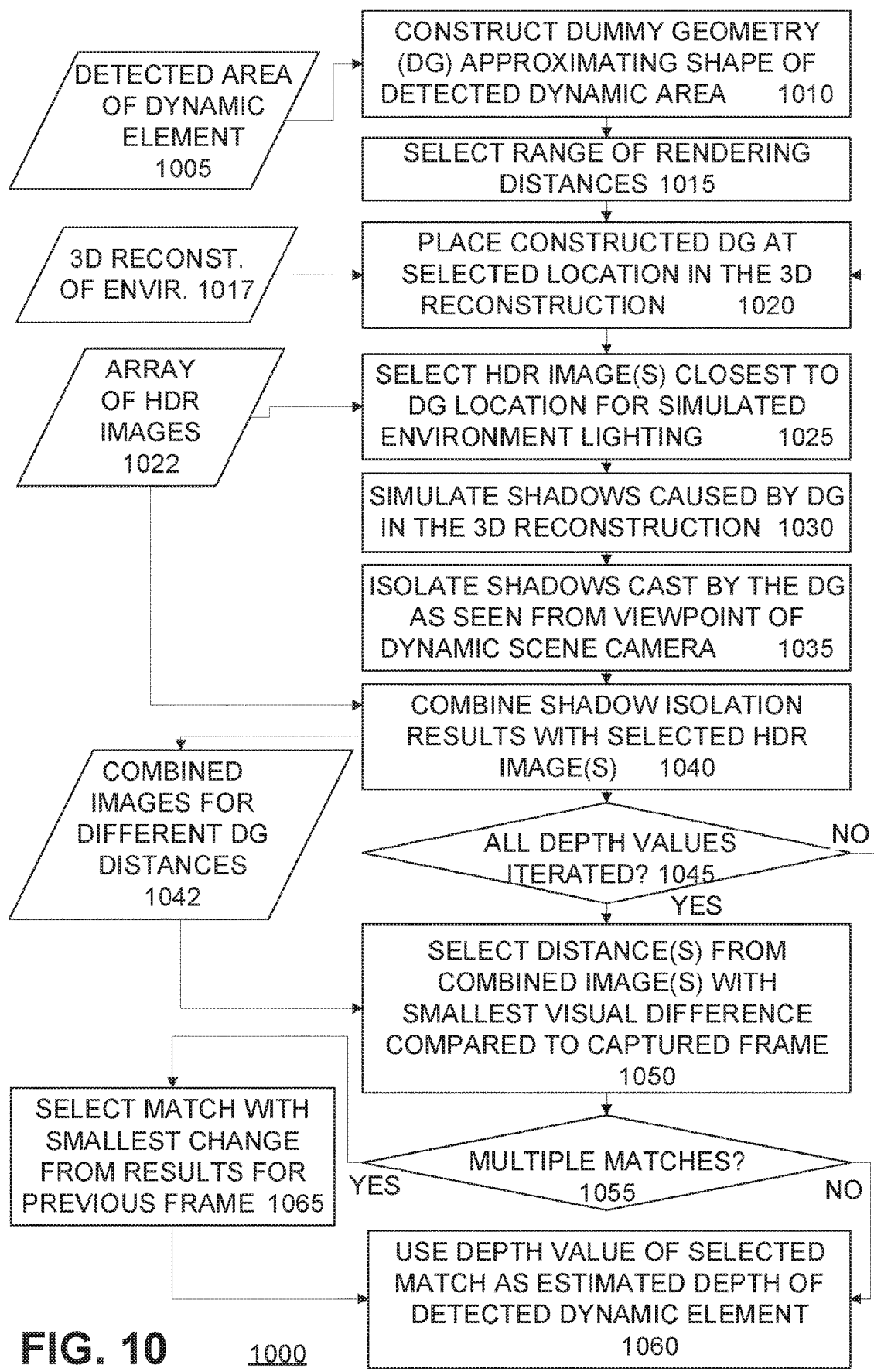
FIG. 10 depicts an example process for estimating the depth of a dynamic element, in accordance with some embodiments.

FIG. 10 is a flow chart illustrating an example process 1000 for estimating the depth of dynamic elements (such may be used at step 825 of FIG. 8) in captured spherical frames, in accordance with some embodiments. From the detected area of a dynamic element in the present captured spherical frame (1005), a dummy geometry approximating the shape of a dynamic area associated with the dynamic element may be constructed (1010). In accordance with some embodiments, the dummy geometry may be constructed by taking the detected area of a particular detected dynamic element (such as from steps 815 and 820 of process 800), and generating 2D points that define a contour of the dynamic element. For example, the OpenCV function 'findContours' may be used to define the object contour. The 2D contour points may be back-projected by a default distance to 3D points in the world coordinates (e.g., coordinates within the captured static scene), such as by using an inverse of a camera matrix. A copy of the 3D points may be generated and offset along the depth axis, and the 3D points connected to generate a 3D geometry comprising a volume. The generated geometry may be inflated to give it a "round" 3D shape. One such approach for image area contouring and inflation to produce 3D volumes is discussed in Igarashi, et al., *"Teddy: A Sketching Interface for 3D Freeform Design"*, in: *ACM SIGGRAPH* 2007 *courses*, Article 21.

With the dummy geometry constructed, a range of possible rendering distances (e.g., range of distances within which the dynamic element may exist in the captured spherical frame) may be selected by inspecting the area of the static environment where the dynamic element is present (1015) and determining a maximal distance at which the dynamic object might be present. Based on the maximal distance, the distance range may be divided into a plurality of initial distance values representing a number of lighting simulations to be executed for each depth estimation iteration for the present detected dynamic element. In accordance with some embodiments, the results from previous frames can be weighted in the selection of initial values to emphasize the likelihood of the dynamic object residing near the distance estimated for it in a previous frame. In accordance with some embodiments, the selection of initial values may also include a random variation factor to avoid aliasing.

The 3D reconstruction of the environment (1017) may be retrieved, and starting at a first initial distance value, the constructed dummy geometry may be placed at the selected location within the 3D reconstruction (1020), such as by adjusting the scale and rendering distance of the dummy geometry according to the current initial distance value. Reviewing the array of HDR images (1022), a model for the environment lighting to be used by a lighting simulation may be retrieved from the HDR images captured approximately where the dummy geometry is currently placed (1025). The lighting simulation may be performed to simulate shadows caused by the dummy geometry (1030) within the 3D reconstruction, using the lighting based on the selected HDR image(s). In the lighting simulation, the dummy geometry blocks some part of the light from the light sources from reaching areas of the static environment reconstruction, and thus some areas appear darker as they are in the shadow cast by the dummy geometry.

The differential rendering approach may be embodied by isolating the shadows cast by the dummy geometry, as seen from the viewpoint of the camera that captured the present dynamic scene frame (1035). The isolated shadows (e.g., the differential rendering) cast by the dummy geometry at the present initial distance value are added to (e.g., combined with) the selected static environment HDR image(s) (1040) as seen from the position of the dynamic scene camera to produce one or more combined images for the present dummy geometry. The combined images for each dummy geometry distance are stored (1042). The process may be iterated (1045) until all test depth values in the determined range are simulated.

With all test depth values simulated, the set of combined images (1042) may be analyzed to determine the combined image with the smallest visual difference compared to the current dynamic scene captured frame (1050). The similarity of the visual appearance may be based on observing visual discrepancies between the captured frame and the produced simulation result. The depth and scale variation producing the most similar visual appearance then gives the best estimate for the actual distance of the dynamic element. Similarity of the visual appearance is measured by observing visual discrepancies between captured frame and the produced simulation result.

This visual discrepancy can be, in the simplest form, a direct comparison between pixel values across images, or other more complex approaches where, for example, areas of shadow are isolated in different images and the similarity of their locations calculated. The estimated depth does not need to be totally accurate, as long as it is sufficient to segregate the dynamic elements into the correct (or appropriate) depth layers.

If there is only one match (1055) from the comparison process 1050, the depth of the single match may be assigned as the selected/estimated depth value of the detected dynamic element (1060). In some instances, there may be multiple matches (1055) which must be selected between. In some embodiments, to select between multiple matches from the comparison process, the matching combination image having the smallest change from the estimated depth for the dynamic element/object in the previous dynamic frame may be selected (1065), assuming the present frame is not the first dynamic frame being processed. This depth value of the selected match from the multiple matches may then be selected as the estimated depth value of the detected dynamic element in the present dynamic frame (1060).

It should be understood that a lighting simulation can be executed using any suitable 3D rendering approach or dedicated light transport simulation solution, and/or the like. For example, advanced real-time lighting approaches such as ARM Enlighten may be used, or an offline renderer such as VRay, RenderMan, POV-Ray, and/or the like.

Different lighting simulations are executed with different distance and size variations of dummy geometries within the possible depth range limits observed from the 3D environment reconstruction. The results are collected and compared to the captured dynamic scene frames. The evaluation of the lighting simulations may be performed iteratively. For each iteration, the distance range to be inspected is divided into a predefined number of different distance values. Results for each different distance value are evaluated and distances with that cause the lowest visual discrepancy between the simulated and the captured image are used to for set the initial distance values for the next iteration. A predefined number of iterations are executed for each frame or at least until low enough visual discrepancy is achieved.

In some embodiments, as the visual discrepancy values produced with different initial distance values are inspected, if the visual discrepancy is too high the initial distance values around the values that produced best results on this iteration are set and the next iteration is performed, if needed. In some embodiments, if the visual discrepancy is low enough, the iteration loop may be completed.

The relation for the distance and size are defined by the projection properties used by the 360 camera to project a spherical view into a 2D image and area of the detected dynamic element in the captured frame.

In some embodiments, the lighting simulation is a differential rendering process. In the process, the created dummy geometry is placed in the 3D reconstruction of the environment and then the light transportation from the light sources is simulated. A model for the environment lighting used by the simulation is retrieved from the HDR images captured approximately at the area where the dummy geometry is placed. In the light transport simulation, the dummy geometry blocks some part of the light from the light sources from reaching areas of the static environment reconstruction. Thus, some areas appear darker as they are in shadow cast by the dummy geometry. These variations in the lighting are collected by the differential rendering as observed from the viewpoint of the camera used to capture the dynamic scene frame. Shadows cast by the dummy geometry at the particular distance are added to the static environment image as seen from the position of the camera.

After the dynamic element distance and scale variations have been executed for one iteration resulting images produced by the combining differential rendering and HDR images of the static scene have been produced, created simulation results are compared with the captured frame of the actual dynamic scene. The depth and scale variation producing the most similar visual appearance then gives the best estimate for the actual distance of the dynamic element. Similarity of the visual appearance is measured by observing visual discrepancies between captured frame and the produced simulation result.

In some embodiments, the visual discrepancy is a direct comparison between pixel values between images or any more complex approach where for example areas of shadow are isolated in both images and similarity of their locations are calculated. Estimated depth does not need to be totally accurate as long as it is good enough guess that can be used to segregate dynamic elements to correct depth layers.

Figure 11:
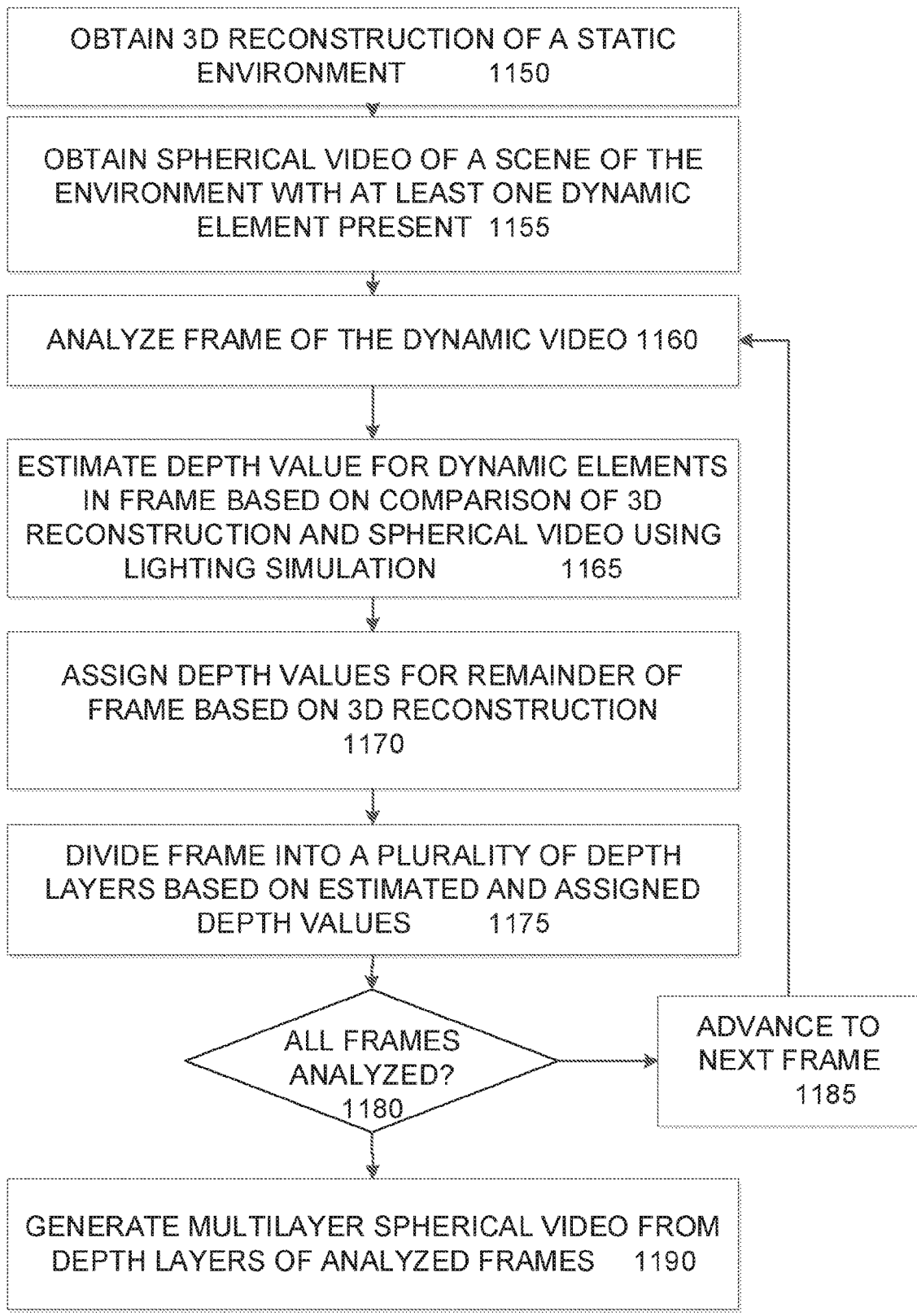
FIG. 11 depicts an example method for estimating the depth of a dynamic element, in accordance with some embodiments.

FIG. 11 depicts an example method 1140 of generating a multilayer spherical video, in accordance with some embodiments. A 3D reconstruction of a static environment may be obtained (1150). A spherical video of a scene of the same environment, with at least one dynamic element present, is obtained (1155). Starting at a first frame of the spherical video, and iterating for each frame in the video, each frame is analyzed (1160).

The analysis for each frame includes estimating depth values for the dynamic element(s) in the current frame (1165), based on comparison of the 3D reconstruction of the static environment and the spherical video using a lighting simulation (for example, as discussed above in relation to FIG. 10). Depth values are assigned for the remainder of the frame based on the 3D reconstruction of the static environment (1170). The frame is then divided into a plurality of depth layers based on the estimated and assigned depth values (1175). If there are still frames to be analyzed (1180), the analysis advances to the next frame (1185) and repeats.

Once all frames have been analyzed (1180), a multilayer spherical video may be generated from the depth layers of the analyzed frames (1190).

In accordance with some embodiments, the process for each frame may also include: registering a camera location relative to the 3D reconstruction of the static environment; selecting a camera image having a closest exposure value to the present frame from a plurality of camera images used for the 3D reconstruction of the static environment; comparing the present frame to the selected camera image captured in the static environment to isolate the dynamic element; detecting shadow areas associated with the dynamic element in the present frame; and segmenting a dynamic object area associated with the dynamic element in the present frame, without the detected shadows within the present frame.

In accordance with some embodiments, the estimating depth values for the dynamic element(s) based on comparison of the 3D reconstruction of the static environment and the spherical video using lighting simulation may comprise: generating a dummy geometry matching a shape of the dynamic object area; simulating changes to the lighting of the 3D reconstruction of the static environment by varying at least one of a scale of the dummy geometry or a distance of the dummy geometry; combining the lighting simulation results with the selected captured image of the static environment to generate a plurality of augmented static frames simulating shadow cast by the dummy geometry at different distances; comparing the plurality of augmented static frames with the present frame to select the augmented static frame with the least visual discrepancy from the present frame; and assigning an average depth for the dynamic element area in the present frame based on the distance of the dummy geometry in the selected augmented static frame.

Direct Object Distance Solving

In some embodiments, an object's distance is determined based on known light source locations and known shadow area locations. In some such embodiments, the lighting model is created so that full 3D locations of the light sources and shadow area locations are known. Some such embodiments may not provide as accurate distances as using full light simulations when there are multiple light sources and a lot of light bouncing off environment surfaces. In the full light simulations, shadows can be quite subtle and distinction of which part of the shadow is coming from which light can be non-trivial to determine.

In a direct object distance solving approach, the created lighting model with the 3D locations and light emission areas is analyzed to determine if the scene setup is suitable for direct object distance solving. If there are only one or a few well defined light sources, direct object distance solving may be used. Evaluation of the suitability for direct object distance solving can also be further evaluated per every captured dynamic scene frame by reviewing the detected shadow areas. Shadow areas may comprise clear enough borders and are not occluded by scene geometry. Based on this evaluation, a decision can be made per each frame if direct dynamic object distance solving is to be used or if the full iterative lighting simulation is used.

When direct object distance solving is used, the distance of the dynamic object is solved with an approach resembling techniques used for 3D rendering of object shadows called shadow volume technique. In this approach, the shadow volume as 3D geometry connecting shadow edges to the light source is created. After the shadow volume has been created, it is rendered from the viewpoint corresponding with the camera location in the captured frame. Here, the area containing the dynamic object is inspected, as the depth of the dynamic object is the average depth value of shadow volume observed from area overlapping with the dynamic object area on the 2D image plane.

Figure 12A:
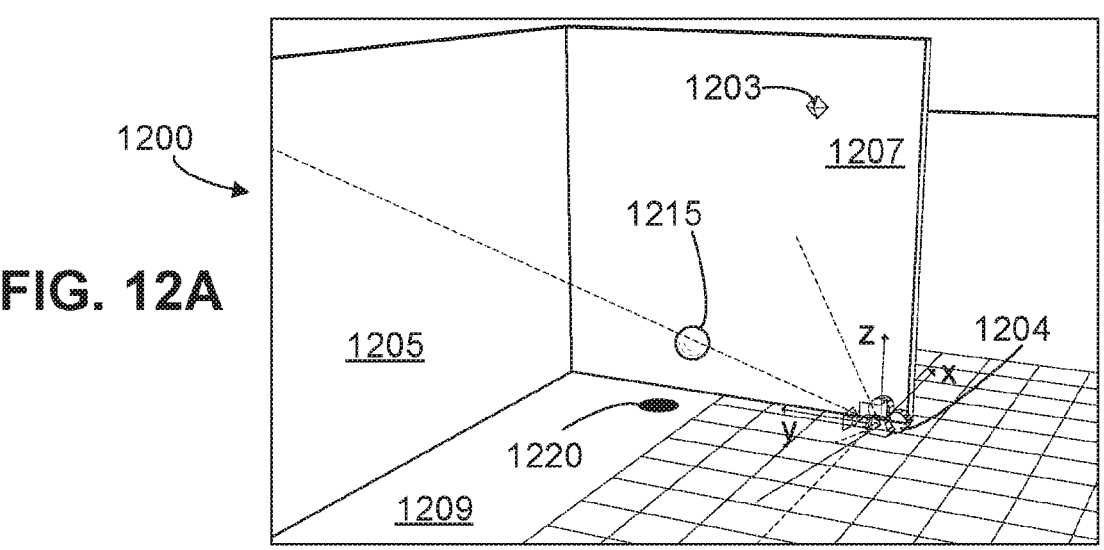
FIGS. 12A-12F depict an example process of direct object distance solving, in accordance with some embodiments.

FIGS. 12A-12F depict an example process of using direct object distance solving, in accordance with some embodiments. As shown in FIG. 12A, a real-world scene 1200 with one main light source 1203 and one dynamic object may be captured, such as by a camera 1204. The 3D location of the light 1203 may be determined in a pre-processing step. As shown in FIG. 12A, the real-world scene 1200 includes a first wall 1205, a second wall 1207 perpendicular to the first wall 1205, and a floor 1209. The dynamic object is represented by a sphere 1215 that projects an oval-shaped shadow 1220 on the floor 1209.

Figure 12B:
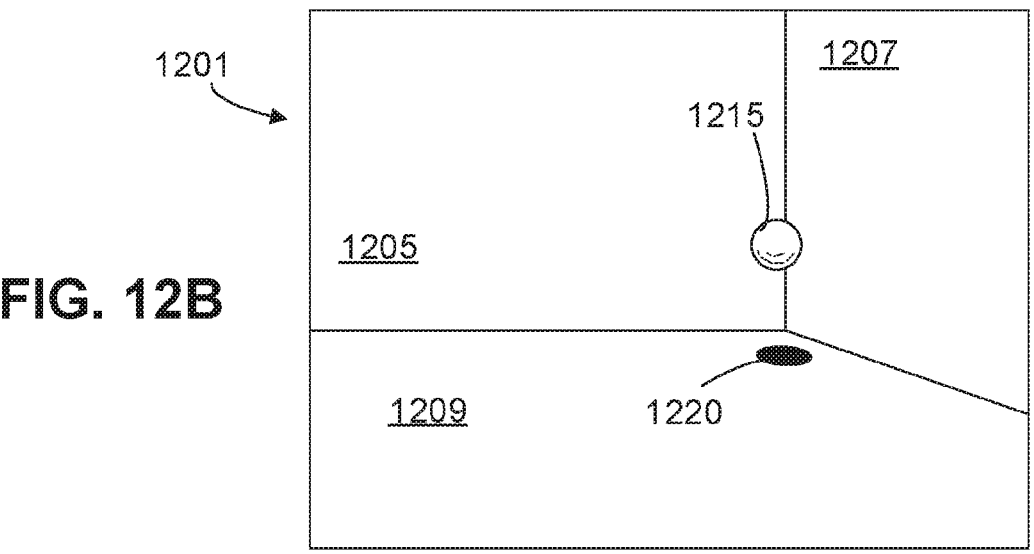
Figure 12C:
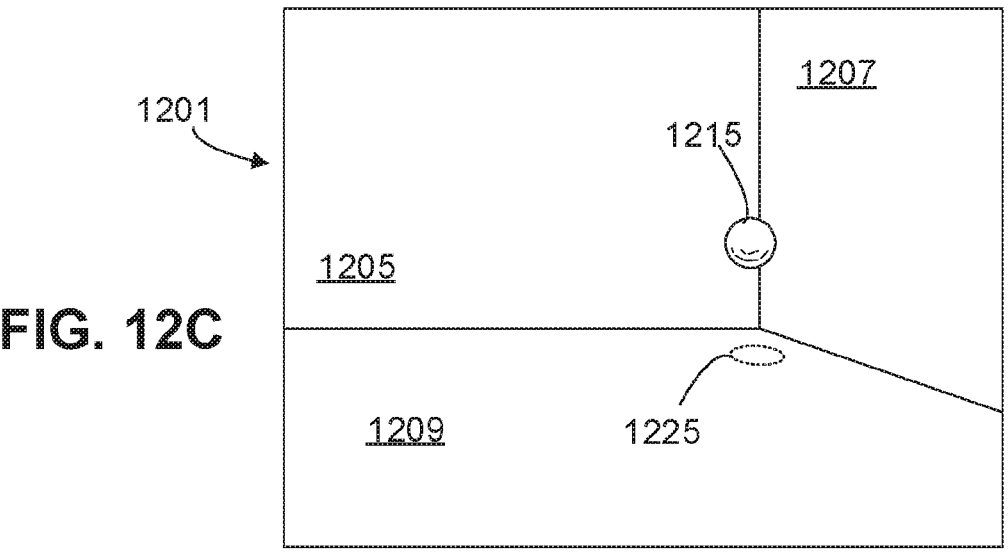
Figure 12D:
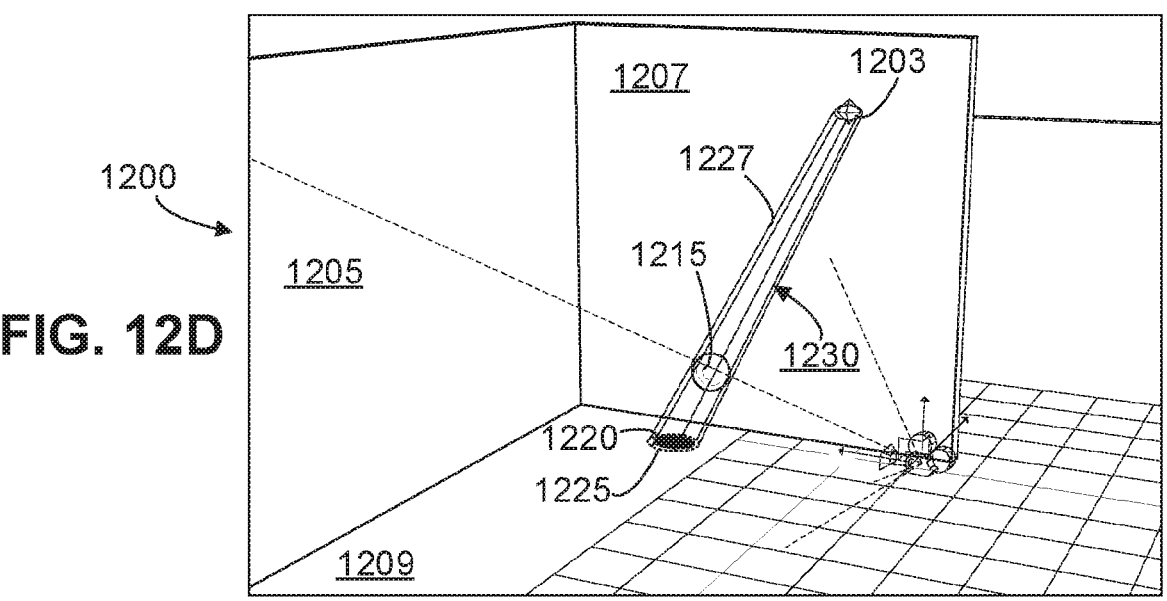
Figure 12E:
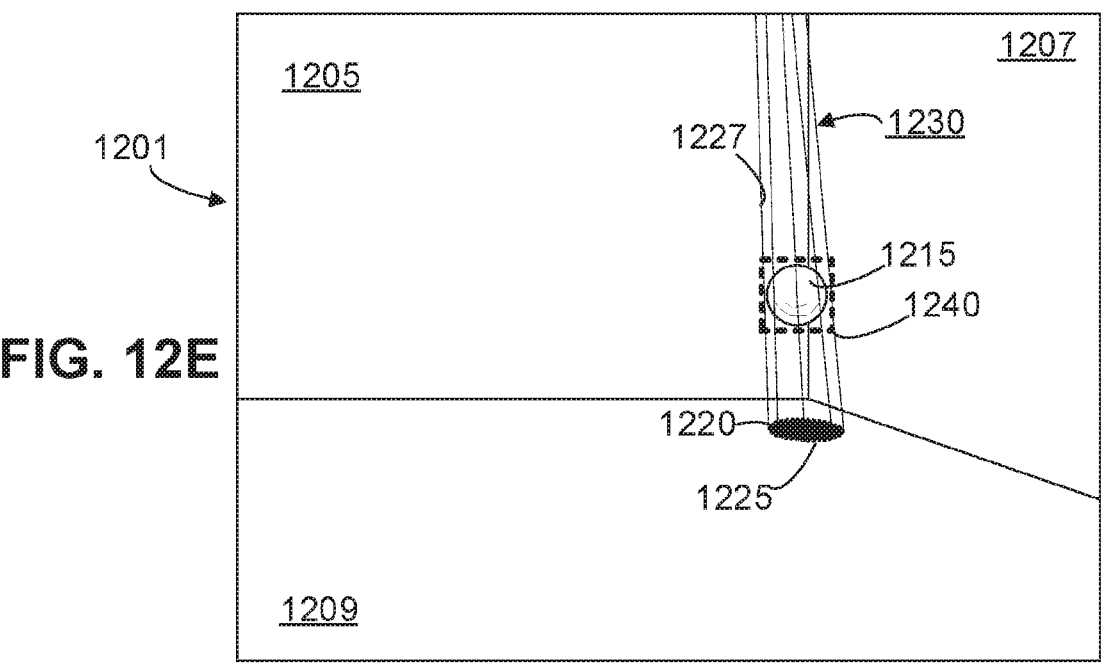
Figure 12F:
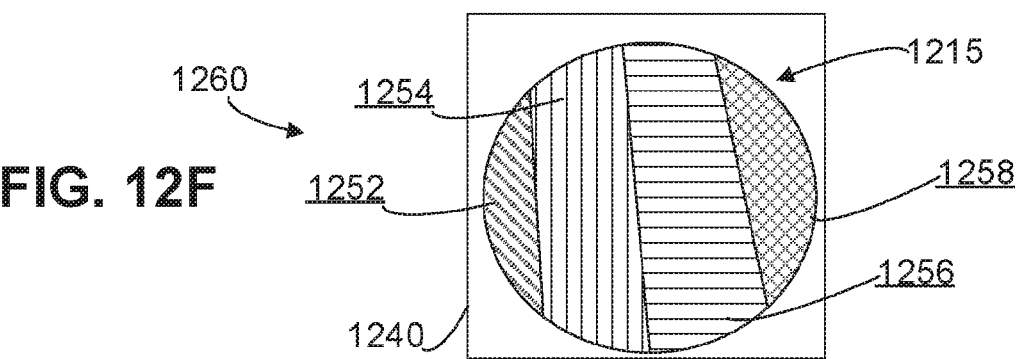

FIGS. 12B and 12C depict a captured frame 1201 of the real-world scene 1200, captured by the camera 1204 seen in the FIG. 12A. As shown in FIG. 12B, the dynamic object 1215 and its shadow 1220 may be detected in the captured frame 1201. As shown in FIG. 12C, the edges 1225 of the shadow may be detected. As shown in FIG. 12D, based on detected shadow edges 1225 and known light source 1203 location (determined in a pre-processing step), a shadow volume 1230 may be created. The shadow edges 1225 are connected to the light source edges 1227 to create the shadow volume 1230. As shown in FIG. 12E, a bounding box 1240 for the area containing the dynamic object 1215 may be created. The bounding box 1240 may be used as a viewport for rendering the shadow volume. FIG. 12F depicts an image 1260 resulting from rendering the shadow volume 1230 using bounding box 1240 as a viewport. As shown in FIG. 12F, the depth values of the shadow volume 1230 may be rendered for pixels that are covered by the dynamic object 1215 as seen in the captured frame 1201 of FIGS. 12B, 12C, and 12E. An average depth of the dynamic object may be estimated as the average depth value of the rendered shadow volume pixels (e.g., different rendered depth values 1252, 1254, 1256, 1258 depicted by different gradient fills in FIG. 12F).

In one example use case, a cinematic VR scene occurs in a living room and is captured as a multilayer spherical video. For this purpose, the living room is first captured without actors and props used in the scene by moving a 360 camera around the space. While the room is being captured, the 360 camera continually records images while iterating through several different shutter speeds in order to produce images with different exposures. While capturing the environment, the 360 camera is moved in the areas where the camera is to be placed when the actual scene is to be filmed and also in the areas where the actors are going to be located during the scene.

Once the environment capturing has been done, the 360 camera is placed on a location selected as a filming position on the center of the room on a tripod. The camera is set to record and actors play out their roles in the space while 360 camera is recording the scene as a spherical video. Once the actors have finished the scene, recording is completed and collected footage can be used to produce a multilayer spherical video.

In the processing of the captured footage, first the static environment processing phase is executed. For static environment processing, the images captured at different exposures from the environment are given as an input for the process. The 3D reconstruction of the environment is created with a structure from a motion approach. This results in a textured 3D geometry of the space and the camera locations for each spherical image given as an input for the 3D reconstruction.

Based on the image locations, images with different exposures captured at the same locations are combined as HDR images. Redundant copies of resulting HDR images that are overlapping or very close to each other may be discarded.

After the static environment processing phase, the spherical video with the actors is transformed into a multilayer spherical video. Here, the spherical video captured with the actors' performance is given as an input for the dynamic content production phase.

Each frame of the spherical video is processed, resulting in a multilayer spherical video that is then stored. Once the multilayer spherical video containing different layers representing different depth ranges and the average depth values of each layer has been stored, the content can be distributed and viewed. On display devices such as VR HMDs capable of head tracking, the motion parallax can be recreated according to the viewer's head motions by rendering the content by mapping each layer sphere scaled to match the average depth value of the layer and then allowing the viewpoint used for rendering to move within these rendering spheres according to the head motions.

In some embodiments, there is an example method of determining a depth of a dynamic object, the method comprising: creating a freeform object matching the shape of the dynamic object detected from a 360 camera image; varying both the scale and the distance of the freeform object; determining a plurality of location and a size data of a shadow created by the freeform object at the various scales and distances; combining the plurality of shadow locations and sizes with a static environment to determine a visual discrepancy of the shadow location and size with the dynamic object; augmenting the static environment with a shadow at location chosen based on the visual discrepancy; and setting a depth value for the object based on the corresponding scale and distance of the freeform object to the selected shadow location and size. The method may further comprise a spherical camera capturing a visual representation of a static environment at a plurality of locations and a plurality of exposure settings. The method may include wherein the location of the spherical camera is recorded at each photo capture. The method may further comprise creating a 3D model of the static environment based on the static capture. The method may further comprise capturing spherical video of the scene with dynamic elements. The method may further comprise generating and storing spherical HDR images of the scene.

In some embodiments, there is an example method comprising: determining a location of a shadow of a dynamic object; detecting edges of the shadow; generating a shadow volume by connecting the shadow edges to a known location of a light source; creating a bounding box for the area containing the dynamic object; and rendering depth values of the shadow volume for pixels covered by the dynamic object. The method may further comprise determining an average depth of the dynamic object based on a distance to the rendered pixels.

Network Architecture

Figure 13A:
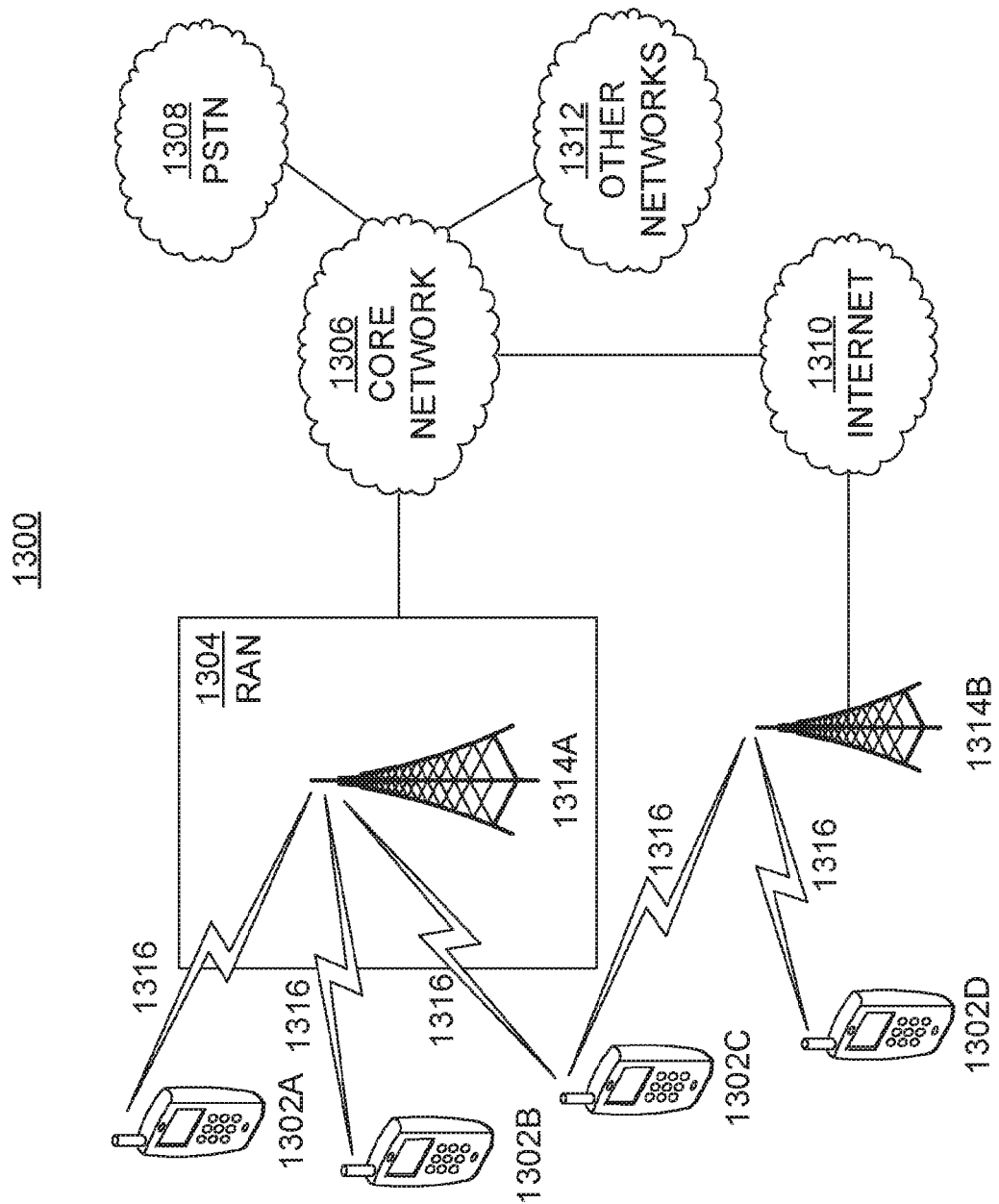
FIG. 13A is a system diagram illustrating an example communications system in which one or more disclosed embodiments may be implemented.

FIG. 13A is a diagram illustrating an example communications system 1300 in which one or more disclosed embodiments may be implemented. The communications system 1300 may be a multiple access system that provides content, such as voice, data, video, messaging, broadcast, etc., to multiple wireless users. The communications system 1300 may enable multiple wireless users to access such content through the sharing of system resources, including wireless bandwidth. For example, the communications systems 1300 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 13A, the communications system 1300 may include wireless transmit/receive units (WTRUs) 1302a, 1302b, 1302c, 1302d, a RAN 1304, a CN 1306, a public switched telephone network (PSTN) 1308, the Internet 1310, and other networks 1312, though it will be appreciated that the disclosed embodiments contemplate any number of WTRUs, base stations, networks, and/or network elements. Each of the WTRUs 1302a, 1302b, 1302c, 1302d may be any type of device configured to operate and/or communicate in a wireless environment. By way of example, the WTRUs 1302a, 1302b, 1302c, 1302d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 1302a, 1302b, 1302c and 1302d may be interchangeably referred to as a UE.

The communications systems 1300 may also include a base station 1314a and/or a base station 1314b. Each of the base stations 1314a, 1314b may be any type of device configured to wirelessly interface with at least one of the WTRUs 1302a, 1302b, 1302c, 1302d to facilitate access to one or more communication networks, such as the CN 1306, the Internet 1310, and/or the other networks 1312. By way of example, the base stations 1314a, 1314b may be a base transceiver station (BTS), a Node-B, an eNode B, a Home Node B, a Home eNode B, a gNB, a NR NodeB, a site controller, an access point (AP), a wireless router, and the like. While the base stations 1314a, 1314b are each depicted as a single element, it will be appreciated that the base stations 1314a, 1314b may include any number of interconnected base stations and/or network elements.

The base station 1314a may be part of the RAN 1304, which may also include other base stations and/or network elements (not shown), such as a base station controller (BSC), a radio network controller (RNC), relay nodes, etc. The base station 1314a and/or the base station 1314b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 1314a may be divided into three sectors. Thus, in one embodiment, the base station 1314a may include three transceivers, i.e., one for each sector of the cell. In an embodiment, the base station 1314a may employ multiple-input multiple output (MIMO) technology and may utilize multiple transceivers for each sector of the cell. For example, beamforming may be used to transmit and/or receive signals in desired spatial directions.

The base stations 1314a, 1314b may communicate with one or more of the WTRUs 1302a, 1302b, 1302c, 1302d over an air interface 1316, which may be any suitable wireless communication link (e.g., radio frequency (RF), microwave, centimeter wave, micrometer wave, infrared (IR), ultraviolet (UV), visible light, etc.). The air interface 1316 may be established using any suitable radio access technology (RAT).

More specifically, as noted above, the communications system 1300 may be a multiple access system and may employ one or more channel access schemes, such as CDMA, TDMA, FDMA, OFDMA, SC-FDMA, and the like. For example, the base station 1314a in the RAN 1304 and the WTRUs 1302a, 1302b, 1302c may implement a radio technology such as Universal Mobile Telecommunications System (UMTS) Terrestrial Radio Access (UTRA), which may establish the air interface 1316 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 1314a and the WTRUs 1302a, 1302b, 1302c may implement a radio technology such as Evolved UMTS Terrestrial Radio Access (E-UTRA), which may establish the air interface 1316 using Long Term Evolution (LTE) and/or LTE-Advanced (LTE-A) and/or LTE-Advanced Pro (LTE-A Pro).

In an embodiment, the base station 1314a and the WTRUs 1302a, 1302b, 1302c may implement a radio technology such as NR Radio Access, which may establish the air interface 1316 using New Radio (NR).

In an embodiment, the base station 1314a and the WTRUs 1302a, 1302b, 1302c may implement multiple radio access technologies. For example, the base station 1314a and the WTRUs 1302a, 1302b, 1302c may implement LTE radio access and NR radio access together, for instance using dual connectivity (DC) principles. Thus, the air interface utilized by WTRUs 1302a, 1302b, 1302c may be characterized by multiple types of radio access technologies and/or transmissions sent to/from multiple types of base stations (e.g., a eNB and a gNB).

In other embodiments, the base station 1314a and the WTRUs 1302a, 1302b, 1302c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1314b in FIG. 13A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 1314b and the WTRUs 1302c, 1302d may implement a radio technology such as IEEE 802.11 to establish a wireless local area network (WLAN). In an embodiment, the base station 1314b and the WTRUs 1302c, 1302d may implement a radio technology such as IEEE 802.15 to establish a wireless personal area network (WPAN). In yet another embodiment, the base station 1314b and the WTRUs 1302c, 1302d may utilize a cellular-based RAT (e.g., WCDMA, CDMA2000, GSM, LTE, LTE-A, LTE-A Pro, NR etc.) to establish a picocell or femtocell. As shown in FIG. 13A, the base station 1314b may have a direct connection to the Internet 1310. Thus, the base station 1314b may not be required to access the Internet 1310 via the CN 1306.

The RAN 1304 may be in communication with the CN 1306, which may be any type of network configured to provide voice, data, applications, and/or voice over internet protocol (VoIP) services to one or more of the WTRUs 1302a, 1302b, 1302c, 1302d. The data may have varying quality of service (QoS) requirements, such as differing throughput requirements, latency requirements, error tolerance requirements, reliability requirements, data throughput requirements, mobility requirements, and the like. The CN 1306 may provide call control, billing services, mobile location-based services, pre-paid calling, Internet connectivity, video distribution, etc., and/or perform high-level security functions, such as user authentication. Although not shown in FIG. 13A, it will be appreciated that the RAN 1304 and/or the CN 1306 may be in direct or indirect communication with other RANs that employ the same RAT as the RAN 1304 or a different RAT. For example, in addition to being connected to the RAN 1304, which may be utilizing a NR radio technology, the CN 1306 may also be in communication with another RAN (not shown) employing a GSM, UMTS, CDMA 2000, WiMAX, E-UTRA, or WiFi radio technology.

The CN 1306 may also serve as a gateway for the WTRUs 1302a, 1302b, 1302c, 1302d to access the PSTN 1308, the Internet 1310, and/or the other networks 1312. The PSTN 1308 may include circuit-switched telephone networks that provide plain old telephone service (POTS). The Internet 1310 may include a global system of interconnected computer networks and devices that use common communication protocols, such as the transmission control protocol (TCP), user datagram protocol (UDP) and/or the internet protocol (IP) in the TCP/IP internet protocol suite. The networks 1312 may include wired and/or wireless communications networks owned and/or operated by other service providers. For example, the networks 1312 may include another CN connected to one or more RANs, which may employ the same RAT as the RAN 1304 or a different RAT.

Some or all of the WTRUs 1302a, 1302b, 1302c, 1302d in the communications system 1300 may include multi-mode capabilities (e.g., the WTRUs 1302a, 1302b, 1302c, 1302d may include multiple transceivers for communicating with different wireless networks over different wireless links). For example, the WTRU 1302c shown in FIG. 13A may be configured to communicate with the base station 1314a, which may employ a cellular-based radio technology, and with the base station 1314b, which may employ an IEEE 802 radio technology.

Figure 13B:
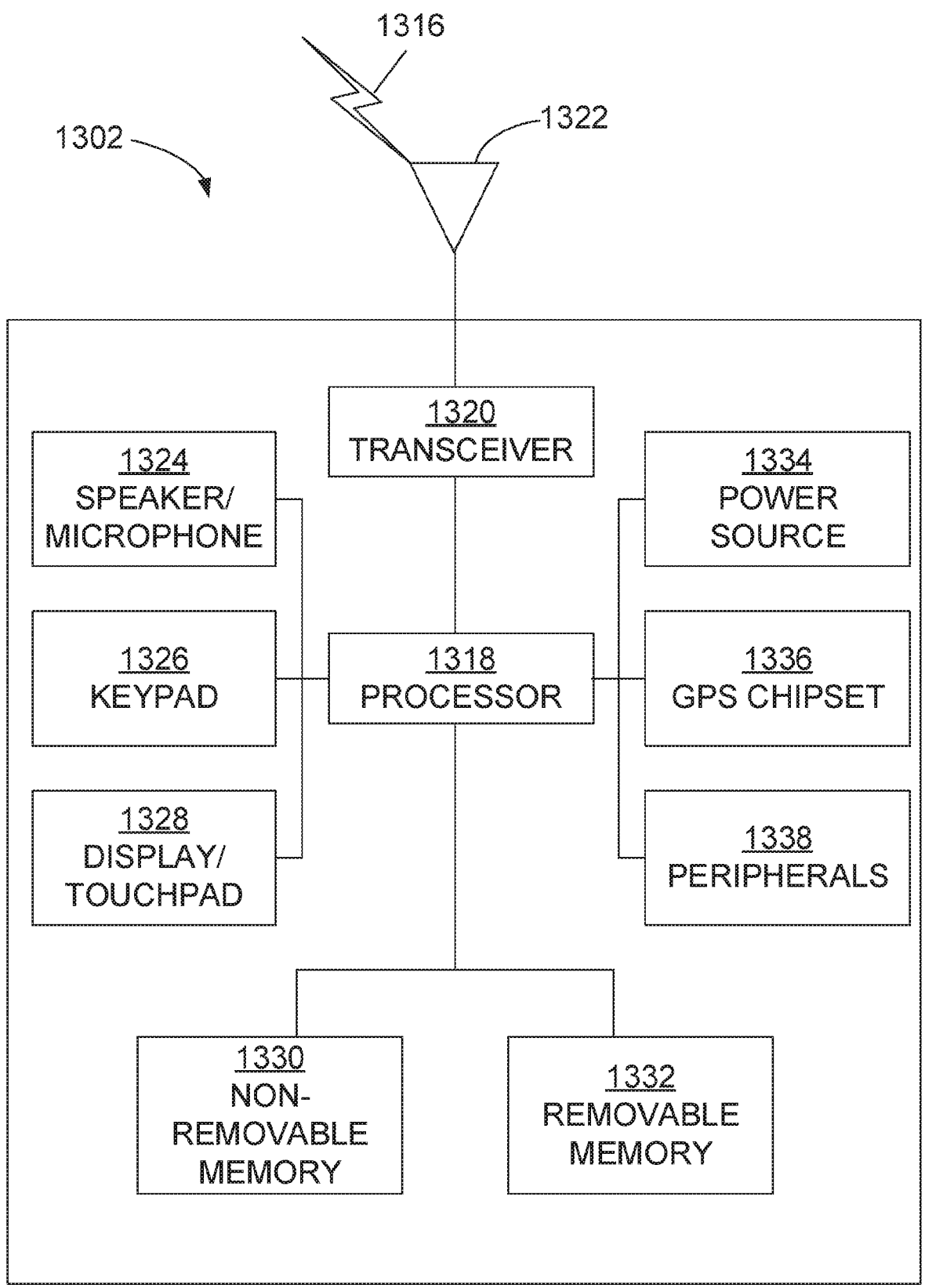
FIG. 13B is a system diagram illustrating an example wireless transmit/receive unit (WTRU) that may be used within the communications system illustrated in FIG. 13A, according to an embodiment.

FIG. 13B is a system diagram illustrating an example WTRU 1302. As shown in FIG. 13B, the WTRU 1302 may include a processor 1318, a transceiver 1320, a transmit/receive element 1322, a speaker/microphone 1324, a keypad 1326, a display/touchpad 1328, non-removable memory 1330, removable memory 1332, a power source 1334, a global positioning system (GPS) chipset 1336, and/or other peripherals 1338, among others. It will be appreciated that the WTRU 1302 may include any sub-combination of the foregoing elements while remaining consistent with an embodiment.

The processor 1318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1318 may perform signal coding, data processing, power control, input/output processing, and/or any other functionality that enables the WTRU 1302 to operate in a wireless environment. The processor 1318 may be coupled to the transceiver 1320, which may be coupled to the transmit/receive element 1322. While FIG. 13B depicts the processor 1318 and the transceiver 1320 as separate components, it will be appreciated that the processor 1318 and the transceiver 1320 may be integrated together in an electronic package or chip.

The transmit/receive element 1322 may be configured to transmit signals to, or receive signals from, a base station (e.g., the base station 1314a) over the air interface 1316. For example, in one embodiment, the transmit/receive element 1322 may be an antenna configured to transmit and/or receive RF signals. In an embodiment, the transmit/receive element 1322 may be an emitter/detector configured to transmit and/or receive IR, UV, or visible light signals, for example. In yet another embodiment, the transmit/receive element 1322 may be configured to transmit and/or receive both RF and light signals. It will be appreciated that the transmit/receive element 1322 may be configured to transmit and/or receive any combination of wireless signals.

Although the transmit/receive element 1322 is depicted in FIG. 13B as a single element, the WTRU 1302 may include any number of transmit/receive elements 1322. More specifically, the WTRU 1302 may employ MIMO technology. Thus, in one embodiment, the WTRU 1302 may include two or more transmit/receive elements 1322 (e.g., multiple antennas) for transmitting and receiving wireless signals over the air interface 1316.

The transceiver 1320 may be configured to modulate the signals that are to be transmitted by the transmit/receive element 1322 and to demodulate the signals that are received by the transmit/receive element 1322. As noted above, the WTRU 1302 may have multi-mode capabilities. Thus, the transceiver 1320 may include multiple transceivers for enabling the WTRU 1302 to communicate via multiple RATs, such as NR and IEEE 802.11, for example.

The processor 1318 of the WTRU 1302 may be coupled to, and may receive user input data from, the speaker/microphone 1324, the keypad 1326, and/or the display/touchpad 1328 (e.g., a liquid crystal display (LCD) display unit or organic light-emitting diode (OLED) display unit). The processor 1318 may also output user data to the speaker/microphone 1324, the keypad 1326, and/or the display/touchpad 1328. In addition, the processor 1318 may access information from, and store data in, any type of suitable memory, such as the non-removable memory 1330 and/or the removable memory 1332. The non-removable memory 1330 may include random-access memory (RAM), read-only memory (ROM), a hard disk, or any other type of memory storage device. The removable memory 1332 may include a subscriber identity module (SIM) card, a memory stick, a secure digital (SD) memory card, and the like. In other embodiments, the processor 1318 may access information from, and store data in, memory that is not physically located on the WTRU 1302, such as on a server or a home computer (not shown).

The processor 1318 may receive power from the power source 1334, and may be configured to distribute and/or control the power to the other components in the WTRU 1302. The power source 1334 may be any suitable device for powering the WTRU 1302. For example, the power source 1334 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1318 may also be coupled to the GPS chipset 1336, which may be configured to provide location information (e.g., longitude and latitude) regarding the current location of the WTRU 1302. In addition to, or in lieu of, the information from the GPS chipset 1336, the WTRU 1302 may receive location information over the air interface 1316 from a base station (e.g., base stations 1314a, 1314b) and/or determine its location based on the timing of the signals being received from two or more nearby base stations. It will be appreciated that the WTRU 1302 may acquire location information by way of any suitable location-determination method while remaining consistent with an embodiment.

The processor 1318 may further be coupled to other peripherals 1338, which may include one or more software and/or hardware modules that provide additional features, functionality and/or wired or wireless connectivity. For example, the peripherals 1338 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1338 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 1302 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 1318). In an embodiment, the WRTU 1302 may include a half-duplex radio for which transmission and reception of some or all of the signals (e.g., associated with particular subframes for either the UL (e.g., for transmission) or the downlink (e.g., for reception)).

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (or hardwired) instructions, firmware instructions, software instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of emulating motion parallax at a head mounted display (HMD), comprising:
   receiving a 3D video at a HMD;
   obtaining a model of an object in the 3D video;
   obtaining a processed 3D video in which the 3D video is processed to remove the object from the 3D video;
   tracking a change in position of the HMD by a sensor of the HMD;
   rendering the processed 3D video at the HMD; and
   rendering the model of the object at a new position in the processed 3D video based on the tracked change in position of the HMD such that a motion parallax effect is provided by a relocation of the object to the new position in the processed 3D video relative to an initial position of the object in the 3D video.

2. The method of claim 1, wherein obtaining the processed 3D video comprises receiving the processed 3D video from a server.

3. The method of claim 1, wherein obtaining the processed 3D video comprises rendering a patch segment over a segment of the 3D video including the object to remove the object from the 3D video.

4. The method of claim 3, wherein rendering the patch segment further comprises receiving the patch segment from a server.

5. The method of claim 3, wherein rendering the patch segment further comprises generating the patch segment at the HMD.

6. The method of claim 5, wherein generating the patch segment at the HMD comprises generating the patch segment using a diminished reality technique on the 3D video.

7. The method of claim 5, wherein generating the patch segment at the HMD comprises using a second model of a second object, wherein the second object is visually behind the first object in the 3D video.

8. The method of claim 1, further comprising:
displaying the received 3D video at the HMD to a user;
detecting a user gaze direction within the displayed 3D video; and
selecting the object for motion parallax emulation based on the detected user gaze direction.

9. The method of claim 8, wherein selecting the object for motion parallax emulation further comprises determining that the object is less than a threshold virtual distance from the user within the displayed 3D video.

10. The method of claim 8, wherein selecting the object for motion parallax emulation further comprises determining that a size of the object is less than a threshold size.

11. A system comprising:
a processor; and
a non-transitory computer-readable storage medium storing instructions operative, when executed on the processor, to cause the system to:
receive a 3D video at a HMD;
obtain a model of an object in the 3D video;
obtain a processed 3D video in which the 3D video is processed to remove the object from the 3D video;
track a change in position of the HMD by a sensor of the HMD;
render the processed 3D video at the HMD; and
render the model of the object at a new position in the processed 3D video based on the tracked change in position of the HMD such that a motion parallax effect is provided by a relocation of the object to the new position in the processed 3D video relative to an initial position of the object in the 3D video.

12. A method for emulating motion parallax at a head mounted display (HMD), comprising:
displaying at a HMD a received 3D video;
selecting an object in the 3D video for motion parallax emulation;
obtaining a 3D model of the object in the 3D video;
removing the object from the 3D video to prepare a processed 3D video without the object;
tracking a change in position of the HMD by a sensor of the HMD;
rendering the processed 3D video at the HMD; and
rendering the 3D model of the object at a new position in the processed 3D video based on the tracked change in position of the HMD such that a motion parallax effect is provided by a relocation of the object to the new position in the processed 3D video relative to an initial position of the object in the 3D video.

13. The method of claim 12, wherein removing the object from the 3D video comprises rendering a patch segment over a segment of the 3D video including the object.

14. The method of claim 13, wherein rendering the patch segment further comprises receiving the patch segment from a server.

15. The method of claim 13, wherein rendering the patch segment further comprises generating the patch segment at the HMD.

16. The method of claim 15, wherein generating the patch segment at the HMD comprises generating the patch segment using a diminished reality technique on the 3D video.

17. The method of claim 15, wherein generating the patch segment at the HMD comprises using a second model of a second object, wherein the second object is visually behind the first object in the 3D video.

18. The method of claim 12, wherein selecting the object comprises:
detecting a user gaze direction within the displayed 3D video; and
selecting the object based on the detected user gaze direction within the displayed 3D video.

19. The method of claim 12, wherein selecting the object further comprises determining that the object is less than a threshold virtual distance from a user within the displayed 3D video.

20. The method of claim 12, wherein selecting the object further comprises determining that a size of the object is less than a threshold size.

* * * * *